(12) United States Patent
Remington et al.

(10) Patent No.: US 12,455,937 B2
(45) Date of Patent: *Oct. 28, 2025

(54) THEFT PREVENTION FOR SENSITIVE INFORMATION

(71) Applicant: CLOUDFLARE, INC., San Francisco, CA (US)

(72) Inventors: Darren Remington, Mesa, AZ (US); Michael Conrad, Monroe, WA (US); Killian Koenig, Seattle, WA (US); Trevor Sundberg, Kirkland, WA (US); David Harnett, Seattle, WA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,307

(22) Filed: Jan. 22, 2024

(65) Prior Publication Data
US 2024/0160683 A1 May 16, 2024

Related U.S. Application Data

(63) Continuation of application No. 16/389,879, filed on Apr. 19, 2019, now Pat. No. 11,880,422.
(Continued)

(51) Int. Cl.
*G06F 16/957* (2019.01)
*G06F 9/451* (2018.01)
(Continued)

(52) U.S. Cl.
CPC ........ *G06F 16/9574* (2019.01); *G06F 9/452* (2018.02); *G06F 16/9577* (2019.01);
(Continued)

(58) Field of Classification Search
CPC ........ G06Q 2220/10; G06Q 20/00–425; G06F 16/00–986; G06F 9/00–548; G06F 21/00–88; H04L 67/00–75
(Continued)

(56) References Cited

U.S. PATENT DOCUMENTS 5,835,096 A 11/1998 Baldwin
5,909,545 A 6/1999 Frese et al.
(Continued)

FOREIGN PATENT DOCUMENTS

CN 102316093 A 1/2012
CN 102333075 A 1/2012
(Continued)

OTHER PUBLICATIONS

Notice of Allowance, U.S. Appl. No. 16/781,854, Jan. 25, 2023, 5 pages.
(Continued)

*Primary Examiner* — Mohammad A. Nilforoush
(74) *Attorney, Agent, or Firm* — NICHOLSON DE VOS WEBSTER & ELLIOTT LLP

(57) ABSTRACT

Methods, systems, and techniques for application isolation by remote-enabling applications are provided. Example embodiments provide an Adaptive Rendering Application Isolation System ("ARAIS"), which transparently enables applications to run in an isolated execution environment yet be rendered locally in a manner that facilitates preventing theft of sensitive information while allowing users to interact with any third-party application or website via the local environment without overburdening available bandwidth or computational resources by, in some cases, evaluating only select information responsive only to select events, as compared to whitelist/blacklist techniques, monitoring all information provided by the user, or other techniques. The
(Continued)

ARAIS typically includes an orchestrator server that comprises one or more of a sensitive-information theft-prevention logic engine, information-theft prevention engines, or a rules engine. These components cooperate to deliver isolation-ready technology with sensitive-information theft prevention to client applications.

20 Claims, 14 Drawing Sheets

Related U.S. Application Data

(60) Provisional application No. 62/800,948, filed on Feb. 4, 2019, provisional application No. 62/800,937, filed on Feb. 4, 2019.

(51) Int. Cl.
  *G06F 16/958* (2019.01)
  *G06F 21/62* (2013.01)
  *G06F 21/71* (2013.01)
  *G06F 40/14* (2020.01)
  *H04L 67/131* (2022.01)

(52) U.S. Cl.
  CPC .......... *G06F 16/972* (2019.01); *G06F 16/986* (2019.01); *G06F 21/6245* (2013.01); *G06F 21/6281* (2013.01); *G06F 21/629* (2013.01); *G06F 21/71* (2013.01); *G06F 40/14* (2020.01); *H04L 67/131* (2022.05)

(58) Field of Classification Search
  USPC .......................................................... 705/50
  See application file for complete search history.

(56) References Cited

U.S. PATENT DOCUMENTS

| | | |
|---|---|---|
| 6,279,001 B1 | 8/2001 | Debettencourt et al. |
| 6,384,821 B1 | 5/2002 | Borrel et al. |
| 6,704,024 B2 | 3/2004 | Robotham et al. |
| 6,832,380 B1 | 12/2004 | Lau et al. |
| 7,003,565 B2 | 2/2006 | Hind et al. |
| 7,552,467 B2 | 6/2009 | Lindsay |
| 7,555,529 B2 | 6/2009 | Bloomfield et al. |
| 7,634,810 B2 | 12/2009 | Goodman et al. |
| 7,657,837 B2 | 2/2010 | Shappir et al. |
| 7,865,931 B1 | 1/2011 | Stone et al. |
| 7,982,749 B2 | 7/2011 | Mathew et al. |
| 7,984,500 B1 | 7/2011 | Khanna et al. |
| 8,019,995 B2 | 9/2011 | Van Bemmel |
| 8,140,610 B2 | 3/2012 | Abdo et al. |
| 8,176,434 B2 | 5/2012 | Saul et al. |
| 8,189,661 B2 | 5/2012 | Abdo et al. |
| 8,209,372 B2 | 6/2012 | Abdo et al. |
| 8,214,899 B2 | 7/2012 | Chien |
| 8,220,047 B1 * | 7/2012 | Soghoian .............. H04L 51/214 709/227 |
| 8,291,065 B2 | 10/2012 | Goodman et al. |
| 8,306,807 B2 | 11/2012 | Van et al. |
| 8,307,103 B2 | 11/2012 | Abdo et al. |
| 8,332,626 B2 | 12/2012 | Mansfield |
| 8,370,899 B2 | 2/2013 | Shoval et al. |
| 8,375,434 B2 | 2/2013 | Cottrell et al. |
| 8,453,049 B1 | 5/2013 | Grieve et al. |
| 8,474,035 B2 | 6/2013 | Wei et al. |
| 8,504,654 B1 | 8/2013 | Kominac et al. |
| 8,607,054 B2 | 12/2013 | Ramarathinam et al. |
| 8,615,795 B2 | 12/2013 | Cottrell et al. |
| 8,621,604 B2 | 12/2013 | Chien |
| 8,762,861 B2 | 6/2014 | Hyndman et al. |
| 8,763,009 B2 | 6/2014 | Degirmenci et al. |
| 8,776,169 B2 | 7/2014 | Rajagopal et al. |
| 8,799,357 B2 | 8/2014 | Clift et al. |
| 8,866,701 B2 | 10/2014 | Momchilov et al. |
| 8,881,227 B2 | 11/2014 | Rajagopal et al. |
| 8,913,068 B1 | 12/2014 | Kokkevis et al. |
| 8,941,673 B2 | 1/2015 | Larsson |
| 8,949,726 B2 | 2/2015 | Kominac et al. |
| 8,970,450 B2 | 3/2015 | Momchilov |
| 9,009,334 B1 | 4/2015 | Jenkins et al. |
| 9,015,090 B2 | 4/2015 | Chien |
| 9,075,895 B2 | 7/2015 | Lindsey et al. |
| 9,092,249 B2 | 7/2015 | Stone |
| 9,124,668 B2 | 9/2015 | Giebler |
| 9,137,238 B1 | 9/2015 | Jakobsson |
| 9,167,020 B2 | 10/2015 | Abdo et al. |
| 9,197,417 B2 * | 11/2015 | Ghanaie-Sichanie ........................ G06F 21/53 |
| 9,244,912 B1 | 1/2016 | Kominac et al. |
| 9,246,904 B2 | 1/2016 | Rajagopal et al. |
| 9,257,097 B2 | 2/2016 | Subramaniam et al. |
| 9,363,134 B1 | 6/2016 | Goodspeed |
| 9,367,947 B2 | 6/2016 | Stone |
| 9,391,832 B1 | 7/2016 | Song et al. |
| 9,395,885 B1 | 7/2016 | Kominac et al. |
| 9,430,036 B1 | 8/2016 | Kominac et al. |
| 9,460,284 B1 | 10/2016 | Hajmasan et al. |
| 9,521,118 B2 | 12/2016 | Cottrell et al. |
| 9,535,560 B1 | 1/2017 | Kominac et al. |
| 9,537,873 B2 | 1/2017 | Petry et al. |
| 9,582,600 B1 | 2/2017 | Killian et al. |
| 9,634,999 B1 * | 4/2017 | Marion ................... G06F 21/64 |
| 9,646,394 B2 | 5/2017 | Lindsey |
| 9,674,145 B2 | 6/2017 | Chien |
| 9,767,110 B2 | 9/2017 | Lindsey et al. |
| 9,898,610 B1 * | 2/2018 | Hadsall .............. G06V 40/1365 |
| 9,912,677 B2 | 3/2018 | Chien |
| 9,954,825 B2 | 4/2018 | Prey et al. |
| 9,965,133 B1 | 5/2018 | Lindsey et al. |
| 10,002,403 B2 | 6/2018 | Abdo et al. |
| 10,027,700 B2 | 7/2018 | Petry et al. |
| 10,062,141 B2 | 8/2018 | Lifshitz et al. |
| 10,084,791 B2 | 9/2018 | Chien |
| 10,185,761 B2 | 1/2019 | Mahjoub et al. |
| 10,268,522 B2 | 4/2019 | Ferris et al. |
| 10,949,488 B1 * | 3/2021 | Kanfer ................... G06F 40/146 |
| 11,880,422 B2 * | 1/2024 | Remington ............. G06F 40/14 |
| 2001/0000265 A1 | 4/2001 | Schreiber et al. |
| 2002/0078255 A1 | 6/2002 | Narayan |
| 2002/0154214 A1 | 10/2002 | Scallie et al. |
| 2003/0041093 A1 | 2/2003 | Yamane et al. |
| 2003/0120658 A1 | 6/2003 | Carneal et al. |
| 2003/0177172 A1 | 9/2003 | Duursma et al. |
| 2003/0208634 A1 | 11/2003 | McElligott |
| 2004/0049530 A1 | 3/2004 | Lok et al. |
| 2004/0085310 A1 | 5/2004 | Snuffer |
| 2004/0165007 A1 | 8/2004 | Shafron |
| 2004/0179262 A1 | 9/2004 | Harman et al. |
| 2004/0183756 A1 | 9/2004 | Freitas et al. |
| 2005/0012749 A1 | 1/2005 | Gonzalez et al. |
| 2005/0050548 A1 | 3/2005 | Sheinis et al. |
| 2005/0140694 A1 | 6/2005 | Subramanian et al. |
| 2005/0257243 A1 | 11/2005 | Baker |
| 2006/0082583 A1 | 4/2006 | Leichtling et al. |
| 2006/0123478 A1 | 6/2006 | Rehfuss et al. |
| 2006/0184614 A1 | 8/2006 | Baratto et al. |
| 2006/0200535 A1 | 9/2006 | Moser |
| 2006/0230105 A1 | 10/2006 | Shappir et al. |
| 2006/0230438 A1 | 10/2006 | Shappir et al. |
| 2006/0248571 A1 | 11/2006 | Ruge |
| 2006/0285172 A1 | 12/2006 | Hull et al. |
| 2007/0055749 A1 | 3/2007 | Chien |
| 2007/0067104 A1 | 3/2007 | Mays |
| 2007/0211065 A1 | 9/2007 | Feth et al. |
| 2008/0042923 A1 | 2/2008 | De Laet |
| 2008/0098006 A1 | 4/2008 | Pedersen et al. |
| 2008/0100626 A1 | 5/2008 | Diard |
| 2008/0152097 A1 | 6/2008 | Kent |
| 2008/0170622 A1 | 7/2008 | Gordon et al. |
| 2008/0211816 A1 | 9/2008 | Gonzalez et al. |
| 2008/0212942 A1 | 9/2008 | Gordon et al. |

(56) References Cited

U.S. PATENT DOCUMENTS

| | | |
|---|---|---|
| 2008/0301566 A1 | 12/2008 | Abdo et al. |
| 2009/0190028 A1 | 7/2009 | Rodriguez et al. |
| 2009/0207167 A1 | 8/2009 | Pasetto |
| 2009/0259588 A1 | 10/2009 | Lindsay |
| 2009/0303245 A1 | 12/2009 | Soupikov et al. |
| 2009/0305790 A1 | 12/2009 | Lu et al. |
| 2009/0327354 A1 | 12/2009 | Resnick et al. |
| 2009/0328109 A1 | 12/2009 | Pavlovskaia et al. |
| 2010/0013842 A1 | 1/2010 | Green et al. |
| 2010/0020098 A1 | 1/2010 | Elmieh et al. |
| 2010/0079480 A1 | 4/2010 | Murtagh |
| 2010/0138780 A1 | 6/2010 | Marano et al. |
| 2010/0158109 A1 | 6/2010 | Dahlby et al. |
| 2010/0228871 A1 | 9/2010 | Schmieder et al. |
| 2010/0254603 A1 | 10/2010 | Rivera |
| 2010/0268813 A1 | 10/2010 | Pahlavan et al. |
| 2010/0269152 A1 | 10/2010 | Pahlavan et al. |
| 2010/0299436 A1 | 11/2010 | Khalid et al. |
| 2010/0302261 A1 | 12/2010 | Abdo et al. |
| 2010/0303146 A1 | 12/2010 | Kamay |
| 2010/0306413 A1 | 12/2010 | Kamay |
| 2010/0318992 A1 | 12/2010 | Kushwaha et al. |
| 2011/0010455 A1 | 1/2011 | Wolfe et al. |
| 2011/0055922 A1 | 3/2011 | Cohen et al. |
| 2011/0078234 A1 | 3/2011 | Engel |
| 2011/0078532 A1 | 3/2011 | Vonog et al. |
| 2011/0134111 A1 | 6/2011 | Stone |
| 2011/0141123 A1 | 6/2011 | Kumar et al. |
| 2011/0157196 A1 | 6/2011 | Nave et al. |
| 2011/0173251 A1* | 7/2011 | Sandhu ............ G06F 9/455 709/203 |
| 2011/0173564 A1 | 7/2011 | Margarint et al. |
| 2011/0260948 A1 | 10/2011 | Teng et al. |
| 2012/0081353 A1 | 4/2012 | Yusupov et al. |
| 2012/0084791 A1 | 4/2012 | Benedek et al. |
| 2012/0092277 A1 | 4/2012 | Momchilov |
| 2012/0108330 A1 | 5/2012 | Dietrich et al. |
| 2012/0113091 A1 | 5/2012 | Isaacson |
| 2012/0117145 A1 | 5/2012 | Clift et al. |
| 2012/0151369 A1 | 6/2012 | Kominac et al. |
| 2012/0151371 A1 | 6/2012 | Kominac et al. |
| 2012/0206463 A1 | 8/2012 | Reid et al. |
| 2012/0210333 A1 | 8/2012 | Potter et al. |
| 2012/0226742 A1 | 9/2012 | Momchilov et al. |
| 2012/0262379 A1 | 10/2012 | King |
| 2012/0296959 A1 | 11/2012 | Momchilov et al. |
| 2012/0317236 A1 | 12/2012 | Abdo et al. |
| 2013/0002688 A1 | 1/2013 | Zhu et al. |
| 2013/0042259 A1 | 2/2013 | Urbach |
| 2013/0113833 A1 | 5/2013 | Larsson |
| 2013/0127858 A1 | 5/2013 | Leroy et al. |
| 2013/0138810 A1 | 5/2013 | Binyamin et al. |
| 2013/0219166 A1 | 8/2013 | Ristov et al. |
| 2013/0246513 A1 | 9/2013 | Zaveri et al. |
| 2013/0290858 A1 | 10/2013 | Beveridge |
| 2014/0047007 A1 | 2/2014 | Plant |
| 2014/0184622 A1 | 7/2014 | Xia |
| 2014/0208442 A1 | 7/2014 | Mooring |
| 2014/0310809 A1 | 10/2014 | Li et al. |
| 2014/0344345 A1 | 11/2014 | Venkatraman et al. |
| 2015/0058923 A1 | 2/2015 | Rajagopal et al. |
| 2015/0161754 A1 | 6/2015 | Isaacson |
| 2015/0169616 A1 | 6/2015 | Benraz |
| 2015/0195106 A1 | 7/2015 | Sehr et al. |
| 2015/0222600 A1 | 8/2015 | Cottrell et al. |
| 2015/0350295 A1 | 12/2015 | Isaacson |
| 2015/0358392 A1 | 12/2015 | Ramalingam et al. |
| 2015/0373148 A1 | 12/2015 | He et al. |
| 2016/0006800 A1 | 1/2016 | Summers et al. |
| 2016/0006803 A1 | 1/2016 | Kumar |
| 2016/0050159 A1 | 2/2016 | Cook et al. |
| 2016/0085603 A1 | 3/2016 | Degirmenci et al. |
| 2016/0104264 A1 | 4/2016 | Arulesan et al. |
| 2016/0163017 A1 | 6/2016 | Iwasaki |
| 2016/0330260 A1 | 11/2016 | Ruge |
| 2016/0350061 A1 | 12/2016 | Turner et al. |
| 2017/0011487 A1 | 1/2017 | Billyard |
| 2017/0019393 A1 | 1/2017 | Rajagopal et al. |
| 2017/0041332 A1 | 2/2017 | Mahjoub et al. |
| 2017/0046013 A1 | 2/2017 | Reskusich et al. |
| 2017/0078406 A1 | 3/2017 | Ruge |
| 2017/0126775 A1 | 5/2017 | Schwebke et al. |
| 2017/0171289 A1 | 6/2017 | Fausak et al. |
| 2017/0185799 A1* | 6/2017 | Zheng ............ G06F 16/9535 |
| 2017/0249455 A1 | 8/2017 | Permeh et al. |
| 2017/0257655 A1 | 9/2017 | Quentin |
| 2017/0269953 A1 | 9/2017 | Prey et al. |
| 2017/0329985 A1 | 11/2017 | Barboy et al. |
| 2017/0353497 A1* | 12/2017 | Bradley ............ H04W 12/084 |
| 2018/0113794 A1 | 4/2018 | Yang et al. |
| 2018/0159896 A1 | 6/2018 | Soman et al. |
| 2018/0227326 A1 | 8/2018 | Shavro |
| 2018/0247075 A1 | 8/2018 | Aistrope |
| 2018/0307508 A1 | 10/2018 | Banerjee et al. |
| 2018/0309728 A1 | 10/2018 | Schwebke et al. |
| 2018/0324145 A1 | 11/2018 | Petry et al. |
| 2018/0324206 A1 | 11/2018 | Petry et al. |
| 2018/0338166 A1* | 11/2018 | Amiga ............ H04N 21/6125 |
| 2018/0349283 A1 | 12/2018 | Bhatia et al. |
| 2018/0365334 A1 | 12/2018 | Semlani |
| 2018/0367483 A1 | 12/2018 | Rodriguez et al. |
| 2019/0025903 A1 | 1/2019 | Mehta et al. |
| 2019/0058738 A1 | 2/2019 | Adams et al. |
| 2019/0075130 A1 | 3/2019 | Petry et al. |
| 2019/0087161 A1 | 3/2019 | Sathe et al. |
| 2019/0109820 A1 | 4/2019 | Clark et al. |
| 2019/0213325 A1 | 7/2019 | McKerchar et al. |
| 2019/0279332 A1 | 9/2019 | Kruglick |
| 2019/0391712 A1 | 12/2019 | Singh |
| 2020/0250259 A1 | 8/2020 | Nanavati et al. |

FOREIGN PATENT DOCUMENTS

| | | |
|---|---|---|
| CN | 102333110 A | 1/2012 |
| CN | 102333306 A | 1/2012 |
| CN | 103997487 A | 8/2014 |
| CN | 107801052 A | 3/2018 |
| EP | 2403206 A1 | 1/2012 |
| EP | 2403207 A1 | 1/2012 |
| EP | 2790176 A1 | 10/2014 |
| EP | 3104271 A1 | 12/2016 |
| JP | 5646518 B2 | 12/2014 |
| JP | 6200062 B2 | 9/2017 |
| KR | 10-2014-0027741 A | 3/2014 |
| KR | 10-1914207 B1 | 11/2018 |
| WO | 2009/127067 A1 | 10/2009 |
| WO | 2014/035936 A2 | 3/2014 |
| WO | 2015/023316 A1 | 2/2015 |
| WO | 2016/177678 A1 | 11/2016 |
| WO | 2020/141391 A1 | 7/2020 |

OTHER PUBLICATIONS

Notice of Allowance, U.S. Appl. No. 16/781,854, May 10, 2023, 2 pages.

Notice of Allowance, U.S. Appl. No. 16/781,854, Sep. 29, 2022, 5 pages.

Notice of Allowance, U.S. Appl. No. 16/781,859, Feb. 17, 2022, 8 pages.

Notice of Allowance, U.S. Appl. No. 16/781,859, Nov. 10, 2021, 2 pages.

Notice of Allowance, U.S. Appl. No. 16/781,859, Oct. 21, 2021, 20 pages.

Notice of Allowance, U.S. Appl. No. 16/781,861, Feb. 23, 2023, 9 pages.

Notice of Allowance, U.S. Appl. No. 16/781,861, Sep. 8, 2022, 9 pages.

Notice of Allowance, U.S. Appl. No. 17/566,550, Apr. 5, 2023, 5 pages.

Notice of Allowance, U.S. Appl. No. 16/781,854, Apr. 15, 2022, 11 pages.

(56) References Cited

OTHER PUBLICATIONS

Open Simulator, "drawing commands", 2021 (Year: 2021).
Perrin, "Information processing apparatus, control method therefor, and program", 2016 (Year: 2016).
Requirement for Restriction/Election, U.S. Appl. No. 16/781,861, Jan. 15, 2021, 5 pages.
Stelovsky et al., "A System for Specification and Rapid Prototyping of Application Command Languages", 1988 (Year: 1988).
Technopedia, "Instantiate", 2020 (Year: 2020).
Techopedia, "instantiate", 2021 (Year: 2021).
thesourcecad_com, "150 Autocad command an shortcut list", 2021 (Year: 2021).
Wikipedia, "Instantiation", 2020 (Year: 2020).
Wikipedia, "instantiation", 2021 (Year: 2021).
Yue et al., "BogusBiter: A Transparent Protection Against Phishing Attacks," ACM Trans. Internet Technol. 10, 2, Article 6 (May 2010), 31 pages.
"Ericom Shield Remote Browser Isolation, Protect Your Endpoints and Network From Browser-Based Attacks," Data Sheet, Ericom, Jan. 1, 2018, 2 pages.
"How can I implement authentication in my proxy server?," Information Security Stack Exchange, Aug. 1, 2013, retrieved from the Internet through security.stackexchange.com on Apr. 15, 2019, 8 pages.
"Menlo Security Isolation Platform, Adaptive Clientless Rendering," Menlo Security, Menlo Park, California, Jan. 1, 2016, 8 pages.
"Remote Browser Isolation Technology," WEBGAP, retrieved on the Internet on Feb. 20, 2019, at https://webgap.io/browser-isolalion-technology.html, 3 pages.
"Remote Desktop Protocol: Graphics Device Interface (GDI) Acceleration Extensions," Microsoft Corporation, Jun. 1, 2017, 260 pages.
"Remote Graphics FAQ," Ascender Technologies Ltd., retrieved from the Internet on Jan. 18, 2019, at http://www.ascender.com/remote-graphics/faq, 8 pages.
"Symantec Web Isolation, Advanced Threat Prevention Capabilities for Secure Web Gateways," Data Sheet, Symantec Corporation, Mountain View, California, Jan. 1, 2017, 2 pages.
"Using Cookie-based Authentication with a Forward Proxy," Novell, Micro Focus, posted May 24, 2002, current version: BorderManager 3.7, retrieved from the Internet on Apr. 15, 2019, at https://www.novell.com/coolsolutions/feature/7830.html, 2 pages.
"WebGL Demo Technical Explanation," Ascender Technologies Ltd., retrieved from the Internet on Jan. 22, 2019, at http://www.ascender.com/webgl-demo/webgl-demo-technical-explanation, 3 pages.
"Weblife Service: Next Gen Web Use Isolation," Technology Data Sheet, Weblife, Jan. 1, 2017, 2 pages.
De Lucas et al., "Ultra-Low Power Render-Based Collision Detection for CPU/GPU Systems", 2015 (Year: 2015).
Di Stefano et al., "Strega: A Support for Transparently Handing Resources for Grid Applications", 2004 (Year: 2004).
File Wrapper of U.S. Appl. No. 14/102,341 (Isaacson).
File Wrapper of U.S. Appl. No. 15/998,399 (Adams et al.).
File Wrapper of U.S. Appl. No. 13/281,460 (Isaacson).
File Wrapper of U.S. Appl. No. 14/169,989 (Cottrell et al.).
File Wrapper of U.S. Appl. No. 14/288,764 (Isaacson).
File Wrapper of U.S. Appl. No. 15/281,440 (Rajagopal et al.).
Final Office Action, U.S. Appl. No. 16/389,879, Aug. 27, 2020, 23 pages.
Final Office Action, U.S. Appl. No. 16/389,879, Dec. 4, 2019, 27 pages.
Final Office Action, U.S. Appl. No. 16/389,879, Mar. 2, 2023, 20 pages.
Final Office Action, U.S. Appl. No. 16/389,879, May 11, 2021, 24 pages.
Final Office Action, U.S. Appl. No. 16/781,861, Aug. 25, 2021, 31 pages.
Final Office Action, U.S. Appl. No. 16/389,879, Mar. 28, 2022, 18 pages.
Gupta et al., "Defending against phishing attacks: taxonomy of methods, current issues and future directions," Telecommun Syst (2018) 67:247, https://doi.org/10.1007/s11235-017-0334-z, retrieved from the Internet through springer.com, 18 pages.
Informit, Pfeeger, "Security in Computing", "interception", 2006 (Year: 2006).
Isaacson, "Cloud Graphical Rendering: A New Paradigm," Version 1.6, Ascender Technologies Ltd., Aug. 2013, retrieved from the Internet through www.ascender.com on Jan. 18, 2019, 28 pages.
Isaacson, "Cloud Graphical Rendering: A New Paradigm," Version 1.7, Ascender Technologies Ltd., Aug. 2013, 30 pages.
Isaacson, "Cloud Graphical Rendering: Background to Ascender's Solution Part I," Ascender Technologies Ltd., Aug. 2013, retrieved from the Internet through www.ascender.com on Jan. 18, 2019, 8 pages.
Isaacson, "Cloud Graphical Rendering: Background to Ascender's Solution Part II," Version 1.5, Ascender Technologies Ltd., Aug. 2013, retrieved from the Internet through ascender.com on Jan. 18, 2019, 3 pages.
Isaacson, "Procedural Compression: Efficient, Low Bandwidth Remote Android Graphics," Ascender Technologies Ltd., Jan. 1, 2014, 24 pages.
Isaacson, "Remote Android Rendering Summary," Ascender Technologies Ltd., Jan. 1, 2014, 8 pages.
Isaacson, "Remote Android Rendering," Ascender Technologies Ltd., Jan. 1, 2014, 38 pages.
Isaacson, "Remote Graphical Rendering," Ascender Technologies Ltd., Jan. 1, 2012, 44 pages.
Kobes, Steve (skobes@chromium.org), "Life of a Pixel," Google LLC, Jun. 2018, 55 pages.
Non-Final Office Action, U.S. Appl. No. 16/389,879, Apr. 1, 2020.
Non-Final Office Action, U.S. Appl. No. 16/389,879, Aug. 26, 2022, 18 pages.
Non-Final Office Action, U.S. Appl. No. 16/389,879, Dec. 10, 2020, 19 pages.
Non-Final Office Action, U.S. Appl. No. 16/389,879, Oct. 7, 2021, 18 pages.
Non-Final Office Action, U.S. Appl. No. 16/781,854, Oct. 28, 2021, 6 pages.
Non-Final Office Action, U.S. Appl. No. 16/781,859, Mar. 22, 2021, 19 pages.
Non-Final Office Action, U.S. Appl. No. 16/781,859, Oct. 2, 2020, 36 pages.
Non-Final Office Action, U.S. Appl. No. 16/781,861, Apr. 27, 2021, 26 pages.
Non-Final Office Action, U.S. Appl. No. 17/566,550, Sep. 22, 2022, 21 pages.
Notice of Allowance, U.S. Appl. No. 16/389,879, Sep. 28, 2023, 21 pages.
Notice of Allowance, U.S. Appl. No. 16/503,388, Aug. 8, 2019, 17 pages.
Notice of Allowance, U.S. Appl. No. 16/503,393, Sep. 27, 2019, 10 pages.
Notice of Allowance, U.S. Appl. No. 16/509,278, Oct. 1, 2019, 10 pages.
Notice of Allowance, U.S. Appl. No. 16/554,384, Dec. 4, 2019, 11 pages.
Notice of Allowance, U.S. Appl. No. 16/659,482, Jan. 9, 2020, 9 pages.
Final Office Action, U.S. Appl. No. 18/338,045, Feb. 3, 2025, 22 pages.
Final Office Action, U.S. Appl. No. 18/355,587, Apr. 23, 2025, 22 pages.
Final Office Action, U.S. Appl. No. 18/355,587, Mar. 14, 2024, 22 pages.
Non-Final Office Action, U.S. Appl. No. 18/338,045, Aug. 28, 2024, 24 pages.
Non-Final Office Action, U.S. Appl. No. 18/355,587, Feb. 13, 2024, 20 pages.
Non-Final Office Action, U.S. Appl. No. 18/355,587, Sep. 12, 2024, 22 pages.
Notice of Allowance, U.S. Appl. No. 18/333,285, Jan. 31, 2024, 12 pages.

(56) References Cited

OTHER PUBLICATIONS

Notice of Allowance, U.S. Appl. No. 18/333,285, May 15, 2024, 11 pages.

* cited by examiner

THEFT PREVENTION FOR SENSITIVE INFORMATION

CROSS-REFERENCE TO RELATED APPLICATIONS

This application is a continuation of U.S. application Ser. No. 16/389,879, filed Apr. 19, 2019, which claims the benefit of priority from U.S. Provisional Patent Application No. 62/800,948, entitled APPLICATION REMOTING USING NETWORK VECTOR RENDERING, filed Feb. 4, 2019; and U.S. Provisional Patent Application No. 62/800,937, entitled WEB BROWSER REMOTING USING NETWORK VECTOR RENDERING, filed Feb. 4, 2019, the contents of which applications are incorporated herein by reference in their entireties.

TECHNICAL FIELD

The present disclosure relates to methods, techniques, and systems for preventing theft of sensitive information and, in particular yet not necessarily, to methods, techniques, and systems for preventing theft of sensitive information during a remote application session.

BACKGROUND

Bad actors and cyber-attackers create malicious websites that install malware onto or otherwise attack a user's machine (whether that machine is a PC, Mac, tablet, phone, virtual-reality headset, augmented/mixed reality headset, or other computing device). These attackers can infect a user's machine at many levels, including taking advantage of security holes in operating systems and applications interfaces to system resources and drivers. One solution has been to restrict a user's direct access to the interface to the operating system (the "desktop") from which applications are run and to "remote" the desktop so that it runs in a protected space (e.g., a sandbox or virtual machine) on a server computing system. There are many protocols for forwarding input from the client computing system to the remote desktop and for sending back the output from the remoted desktop application, including Remote Desktop Protocol (RDP) and other similar protocols, all of which communicate output from the remote desktop by sending pixels or video. One difficulty with RDP and similar protocols is that they are specific to desktop operating systems and will not provide an ideal user experience with a web browsing session because the desktop input and output is intercepted at the interface to the underlying operating system. In addition, they may rely on specific operating system services and drivers being present on a client device. For example, RDP assumes a client device supports GDI (a WINDOWS® operating system graphics device interface) which may not be available on non-Windows based devices and other less ideal graphics interfaces are used for those non-Windows based devices. Another difficulty is that they are limited to transfers of pixels (as bitmaps) when remoting to non-Windows operating system clients. Another solution has been to isolate applications on the client computing system in a sandbox such as a virtual machine or equivalent on the client machine itself. However, a disadvantage is that, should an attack somehow escape the sandbox, it can attack the entire client computing system where it is likely to have personally identifiable information linked to the user rather than a remote server. Another disadvantage is that client-side isolation may require installing software on the client computing system.

Additionally, exploits within web browsers provide many avenues for attackers to steal information, gain access, or install malware to a user's machine (whether that machine is a PC, Mac, tablet, phone or other computing device). For example, malicious code can take advantage of a flaw or vulnerability in the operating system or browser software to breach browser security. Active content in today's browsers, such as through use of Flash and/or JavaScript, contributes to browser vulnerability by enabling attackers to identify memory locations, scrape data, and generate malicious code. For example, an exploit might change browser settings without the user's knowledge, or even run arbitrary code by exploiting flaws in the many technologies that execute within the browser, such as HTML, JavaScript, CSS, Java, images, video, etc. As another example, websites can be injected with malicious code which results in 'clickless' infections by which malware is downloaded without requiring the user to do anything but visit the website. This downloaded malware may then steal credential information, effect identify theft, etc. Most problems caused by such attacks are treated "ex post facto" and cannot be prevented in total.

One manner of securing an application is to execute the application remotely on a server instead of locally on a client device where the hosted remoted application can be protected inside of a sandbox, such as a virtual machine. When the application is a web browser, this is sometimes referred to as "browser isolation." One difficulty with using this approach with web browsers is that such browsers require extensive CPU, GPU, and memory resources making them expensive to run on a server.

Several attempted solutions have been employed to address these obstacles and to allow web browsers to be isolated by running them as remote processes. One such solution is to employ "pixel pushing" or "pixel mirroring" which allows a web page to be rendered remotely utilizing a web browser running on an external server to execute any active code associated with the web page and to produce a series of images which are sent back to a client web browser as compressed pixels or video (using for example H264 video format) to be eventually rendered by the web browser on the client device. This approach suffers from high bandwidth usage for sending pixel data, high server cost due to video rasterizing and encoding, high latency in the user experience, and rendering artifacts due to use of lossy compression or video encoding. In addition, malicious code can still penetrate the output sent to the endpoint (client) by changing pixels to embed malicious code to send bad data.

Another solution is to employ "Document Object Model" (DOM) remoting/mirroring. With this solution, the DOM corresponding to a page is sanitized before it is sent to the client to remove potentially malicious code and reconstructed on the client before rendering. This solution yields typically better performance than pixel pushing, but provides a less secure environment. Using DOM mirroring, a sanitizing process on the isolated browser computing system (e.g., a server) identifies bad HTML and active content and cleans up the DOM tree and reformats it without the active content or with content that has been transcoded into a safe format. Since the DOM on the isolated browser (the server) includes HTML, JavaScript, etc., malware still has plenty of opportunities to embed itself and surface. DOM mirroring also fails to support dynamic content (for example, WebGL or Flash), and each browser type renders DOM content differently, which leaves users with inconsistent or unpredictable experiences. Some companies offer solutions that allow a user, such as an IT administrator, to choose how much security is desired versus performance and employ a choice of using DOM mirroring and pixel pushing.

Bad actors and cyber-attackers often also attempt to steal sensitive information, either from enterprises or individuals, via phishing attacks. Phishing attacks typically use emails or web pages to trick users into providing sensitive information, such as credentials, by spoofing emails or web pages to make the victims believe that the emails or web pages are provided by entities that are different than the bad actors or cyber-attackers. The attackers can then use the sensitive information to extract further information or otherwise escalate the extent of the breach (for example, using stolen credentials to take over one or more accounts, access email, enterprise resources, upload malware, hold data for ransom, or other exploitations).

One solution has been to employ whitelists or blacklists of sources (for example, uniform resource locators (URLs), Internet protocol (IP) addresses, email addresses, or other identifiers), either built into an application (for example, a browser) or maintained by network administrators or security systems, and permitting or preventing interaction (for example, sending or receiving email to or from a listed email address, visiting a listed website, or other interactions) based on which list includes the source. However, a majority of sources typically do not appear on either list. For unlisted sources, mechanisms are typically employed to perform a risk assessment of the unknown source based on various factors such as the geographic location associated with the IP address, reputation of the web host of the source, the age of the URL, the presence of abnormal characters in the URL, the generic top-level domain (gTLD) of the source, content in the body of an email or web page, or other factors. Some solutions utilize machine learning to evaluate one or more such factors. System administrators or information technology (IT) associated with the enterprise or user often set threshold values that define whether interaction with a given source is permissible based on a value assigned to the risk assessed factors. This approach provides imperfect results and is a constant chase because the attackers' approaches continuously evolve. This approach also produces false positives and negatives, thereby allowing interaction with some malicious sources and preventing interaction with some legitimate sources.

Some companies or services force websites that are absent from the whitelists or blacklists into read-only mode. This approach results in a large number of false positives and thereby prevents interaction with many legitimate sources and quickly overwhelms IT staff with requests to add sources to the lists. Domain Message Authentication and Conformance (DMARC) is an initiative that attempts to positively identify originators of emails to create a verifiable source of origin to eliminate phishers by enabling senders to publish easily discoverable email authentication policies while enabling receivers to provide authentication reporting to senders. This approach is not currently a viable solution because adoption by email originators has been slow. Also, phishers can become verifiable sources to appear legitimate, thereby defeating the purpose of the initiative.

Another approach is to use physical hardware keys, such as those available under the mark YUBICO®, that prevent use of user credentials without physical possession of the hardware key. This approach is inconvenient because it requires users to carry the hardware key, loss of the hardware key causes problems and consumes time and effort of the user, and not every website, software service, or application supports the hardware key access.

DETAILED DESCRIPTION

Figure 1:
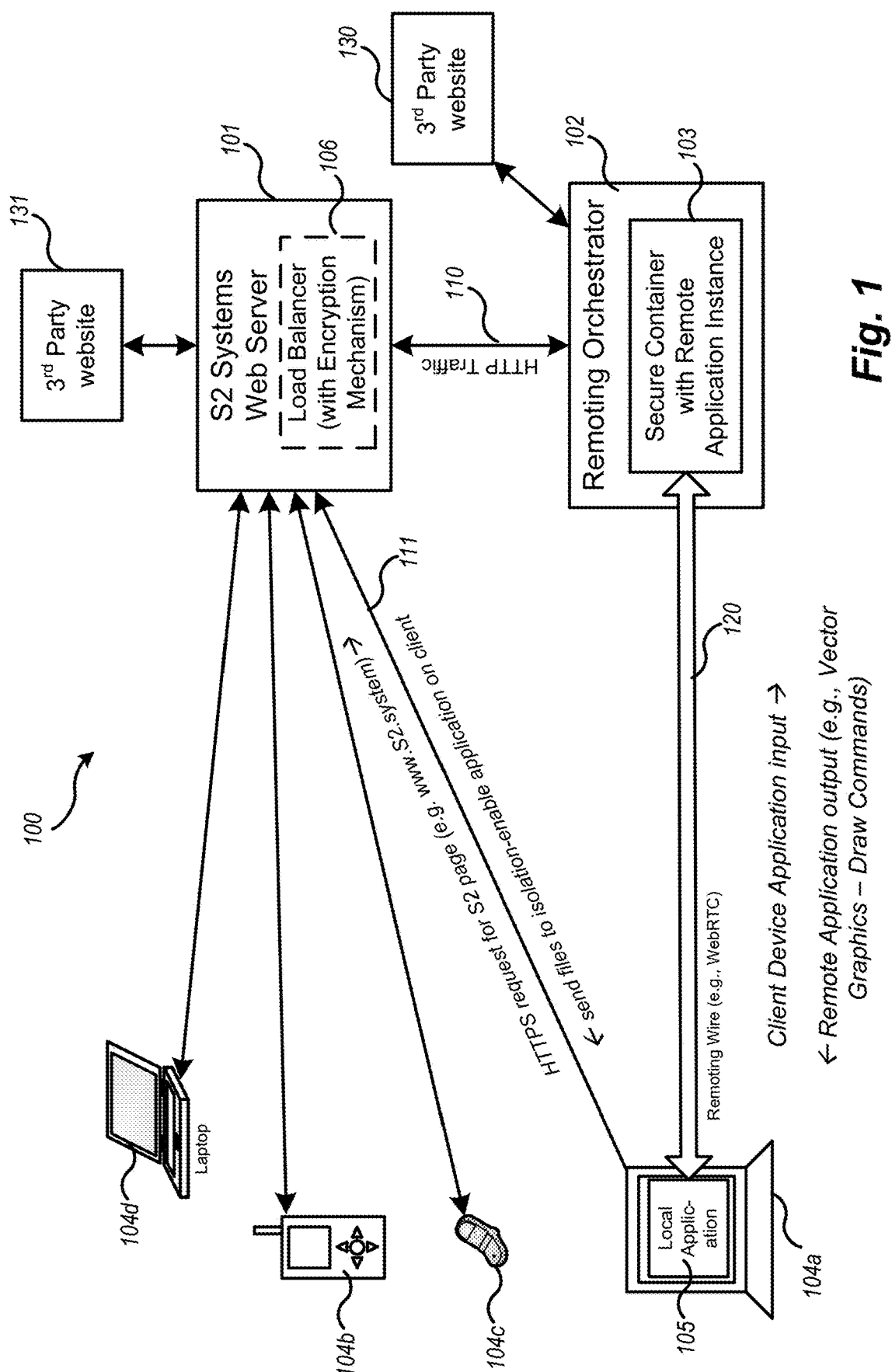
FIG. 1 is an example block diagram of an example secure computing environment for executing remoted applications in isolation with sensitive-information theft prevention using an example Adaptive Rendering Application Isolation System.

Embodiments described herein provide enhanced computer- and network-based methods, techniques, and systems for isolating applications, including web browser applications, to provide more secure environments and reduce unauthorized security vulnerabilities. Example embodiments provide an Adaptive Rendering Application Isolation System ("ARAIS"), which transparently and dynamically enables an existing application to run in an isolated execution environment yet be displayed locally in a manner that facilitates evaluating information that a user attempts to provide from a client computing device to prevent sensitive information from being improperly obtained from the client computing device. The ARAIS prevents theft of sensitive information in a manner that reduces the amount of data evaluated in determining whether information provided from the local computing device includes sensitive information and that reduces false positives and false negatives. In particular, the ARAIS overcomes the problems and inefficiencies of prior anti-phishing solutions by comparing values of one or more fields to values in a database to determine whether the one or more fields include sensitive information, preferably responsive to detecting a trigger event such as a form submit event and preferably by only evaluating fields having values with characteristics that comply with one or more rules, and preventing verified sensitive information from being provided from the local computing device to another computing device responsive to determining that the values include sensitive information. Unlike the other approaches discussed above, the ARAIS solution provides close to zero, if not zero, false positives or negatives because the solution only prevents passing information if that information is verified to include sensitive information. The ARAIS solution also facilitates reducing computational and bandwidth expenses because the field values are preferably evaluated for sensitive information only responsive to detecting a form submit event.

In some versions, the isolated application is rendered locally in a manner that minimizes the amount of data to be transferred and the latency caused by expensive computation and/or by overburdening available bandwidth. In particular, the ARAIS preferably overcomes the problems and inefficiencies of prior isolation solutions by transferring output from the isolated execution environment to the application running locally using draw commands or other higher level graphics primitives where possible instead of using pixels (or bitmaps/video) and by intercepting rendering on the isolated execution environment at a higher level in the graphics rendering pipeline than rasterization. Unlike pixel pushing systems, the ARAIS solution allows the use of less expensive execution (e.g., server) machines that do not require massive and expensive amounts of hardware (such as GPU farms) for rasterization and video encoding. In addition, the rendering data for transport can be optimized, encoded, compressed, packetized (and subsequently depacketized, decompressed, and decoded), etc. based upon proprietary or existing protocols and potentially dynamically based upon known or computed characteristics or rules. By avoiding the transportation of video (pixel pushing) and instead transferring rendering data at a "higher level," application output can be rendered identically on the isolated execution environment and on the local rendering environment at least because lossy compression is not required to reduce the bandwidth consumption to acceptable levels (unlike pixel pushing). Thus, rendering artifacts due, for example, to the use of video encoding or lossy compression can be eliminated or nearly eliminated.

In addition, the ARAIS provides a self-contained delivery mechanism for enabling existing applications such as web browsers to be "isolation-ready" such that they can immediately utilize the secure ARAIS environment without additional coding or configuration by an administrator or end user. Thus, the ARAIS provides a transparent mechanism for equipping a web browser application to be executed remotely and rendered locally; thus, protecting the web browser from malicious attacks. Also, by equipping existing applications with the code and resources needed to be isolation-ready on demand, the ARAIS can handle compatibility issues such as differences between operating systems, web browsers, versions of graphics and other libraries, etc. transparently to the existing application.

Although this disclosure typically refers to the isolated execution environment as a server computing system and the local rendering environment as a client computing system, in example ARAIS environments, the isolated execution environment may be any type of separate environment that allows the isolation-enabled application to be executed independently from where its output is ultimately rendered. Thus, the ARAIS also may be implemented as a peer-to-peer system. In addition, the server system may comprise one or more server systems or servers on a single computing system. For example, the isolated execution environment may be located on a separate computing system from the rendering device or may be located on the same device. In some cases, the isolation execution environment may be located on a separate computing system from the rendering device, and the separate computing system may be hosted entirely in one or more server computing devices that are located in a different premises as the rendering device (e.g., using cloud computing for the one or more server computing devices). In other cases, the isolation execution environment may be located on a separate computing system from the rendering device, and the separate computing system may be hosted completely or partially in one or more server computing devices located in the same premises as the rendering device (e.g., using primarily an on-premises server computing device for low latency, and using a cloud computing device when the on-premises server computing device experiences spikes in user activity). When using the same computing system, a separate instance of the application could be executed in a sandboxed (e.g., containerized or virtualized) environment and used to perform code execution and send rendering data to the instance of the application ultimately responsible for rendering output. Such an architecture allows the application code to be executed safely and separately from the process responsible for rendering output, for example, to an end user. In addition, separation of code execution from output rendering can lead to performance gains in some applications. For example, code execution could be executed on a machine with significantly higher network or CPU resources.

FIG. 1 is an example block diagram of an example secure computing environment for executing remoted applications in isolation and preventing theft of sensitive information using an example Adaptive Rendering Application Isolation System. The remote execution environment 100 comprises one or more client devices 104*a-d* (e.g., a laptop, mobile devices, desktops, or other systems, such as a virtual-reality or augmented/mixed reality headset), a public web server 101, one or more third party websites or data repositories 130 and 131 from which requested content is retrieved, and one or more internal remoting orchestrator servers 102. As explained above, all of these servers can be part of each other and located physically remotely from the client devices 104*a-d* or can be located on the same physical machine as the client endpoint, or in any other architectural layout amenable to isolation (e.g., via sandboxing, containerization, or virtualization).

In overview, an application such as local application 105 (e.g., a web browser) executing (running) on a client device such as client device 104*a* requests instantiation of a remote application or a web page, typically using an HTTPS request. To become isolation enabled, this client request is redirected by a secure component of the web server 101, such as load balancer 106, to a local server, such as orchestration server 102, so that an isolated execution environment, such as secure container with a remote application instance 103, can be configured specifically for that client device (the local application running on the client device). This configuration involves setting up a secure connection 120 between the local application 105 and the isolated execution environment 103. In some scenarios, the connection is directly between the local application 105 and the executing remote instance within the secure container 103 to avoid additional latency. The secure container may be implemented using any mechanism that provides security isolation, such as containerization offered by Docker Inc.'s "Docker" software platform, which provides operating-system-level virtualization across operating system platforms using a "light weight" virtualization solution (containers share an operating system kernel), or more traditional virtualization products (virtual machine implementations) offered for example by third parties.

In one example, the web server 101 resorts to known techniques provided by load balancer 106 or other secure component provided, for example by AWS, AZURE, or another cloud based server infrastructure mechanism, for securely communicating (e.g., via public/private key encryption) initially with the client device 104*a*. That way, if any of the isolated execution environments instantiated on behalf of client devices become compromised, the security of the public web server 101 (such as its private key) is not exposed or compromised. In this example configuration, the load balancer 106 translates client requests into HTTP and redirects the request to the orchestration server 102 via communication 110 using HTTP. All communication between applications running on the client device 104*a* and the remote execution environment 100 is through the secure public web server 101 using HTTPS until the orchestration server 102 is able to establish a secure connection 120 between the local application 105 executing on the client device 104*a* and the corresponding remote instance within the secure container 103 (isolated execution environment). Thereafter, remoting communication is performed via the secure connection 120 directly between the isolated execution environment 103 and the local application 105.

In one example ARAIS, the secure connection 120 is implemented using WebRTC, because WebRTC allows both UDP/IP connections (which uses non-sequenced packets) and TCP/IP connections (which uses sequenced packets) and thus provides greater flexibility. In addition, when using UDP, the secure connection 120 is typically faster. Other secure connection solutions 120 can be used, including for example WebSockets, RDP, and proprietary or other standard known solutions. Implementations of the secure connection 120 preferably support peer-to-peer and unreliable communication channels (e.g., WebRTC) because, when applications can take full advantage of unreliable channels, average latency is typically reduced, especially under lossy network conditions where traditional ordered, reliable mechanisms (e.g., TCP) can suffer from large spikes due to head-of-line blocking.

A secure WebRTC connection can be set up by the client leveraging the secure connection (HTTPS) between the client computing system and web server 101. For example, in one possible configuration, as part of a page returned in response to the initial (redirect) request of a local application 105 running on the client device 104*a* (typically for the "home page"), a packet is returned by the web server 101 (via load balancer 106) containing a file "index.html" which includes initial logic and a key for setting up a WebSocket connection between the local application 105 and the remoting orchestrator 102. As parts of its standard execution loop, the local application 105 executes the logic in the initial file, which includes logic to start up the WebSocket connection. In some instances, the key for this connection is directly hardcoded into the initial html page returned. In other instances, a separate request is made by the local application 105 for the key as a result of executing the html and potentially JavaScript on the initial page. The purpose of this WebSocket connection is to facilitate setting up the secure WebRTC connection using the orchestrator server 102 as the "signal server" (known broker) for establishing a peer to peer connection between application 105 and the instantiated secure container with the remote instance 103 using the WebRTC negotiation protocol.

Meanwhile, after receiving the initial request for the home page, the orchestrator 102 determines which application instance to instantiate in a secure container 103 and sets up a WebSocket connection to this instance (using for example another key). The orchestrator in its return of the initial page to the load balancer 106 can also include an identifier of this remote application instance so that the web server 101 can direct further requests to the correct secure container. Once both WebSocket connections have been made—to the local application 105 and to the secure container running the remote application instance 103—then the orchestrator can act as the signal server. A negotiation can then take place between the local application 105 (performed as a result of executing the logic on the initial or subsequent pages) and the secure container 103 for the WebRTC connection using the orchestrator 102 as the broker. This negotiation generally succeeds (subject to servers going offline) because the orchestrator has working (WebSocket) connections to both parties.

Of note, this is but one technique for initiating a secure connection directly between the local application 105 and the secure container with the remote application instance 103. Other techniques using other protocols and/or other types of connections can be similarly incorporated.

In conjunction with configuring a corresponding isolated execution environment 103, the orchestration server 102 causes remoting code/logic and potentially other resources to be downloaded to the application 105 running on the client device 104*a* via communications paths 110 and 111. Specifically, the remote-enabling files for application 105 on client device 104*a* are determined by the orchestrator server 102, sent via path 110 (using HTTP) to the load balancer 106 running on web server 101, which responds to the client request via path 111 using HTTPS. In one instance, these files are sent as a result of executing logic in the initial file that directs the local application 105 to request these files. In some scenarios, additional and separate computing systems are used to provide these files, giving another step of indirection hence more security but potentially increasing latency. Another advantage to using separate servers for delivering these files is to use different providers based upon the determined rendering level, determine interception techniques, or the like.

The orchestrator server 102 determined files are then "hooked into" (integrated, appended, etc. to) the running local application 105 such that the local application 105 becomes isolation-ready and can communicate with the remote application instance running in the secure container 103 (the isolated execution environment). The integration of the remoting logic into a Chromium web browser to effect an example isolation-ready application is described further below with respect to FIG. 4. The remote-enabling files include logic for rendering output within the local application 105 (thereby replacing or augmenting the default rendering routines or hooking into them) and logic for intercepting input to the local application and forwarding it to the remoted application instance 103.

The remoting logic can be hooked into the running local application 105 by a variety of possible known mechanisms such as by callback mechanisms that take advantage of known architectures and attributes of the application (typically useful when the source code for the local application is known or familiar); hooking known or discoverable application programming interface ("API"); object code injection that replaces portions of the local application's executable code with a different portion of executable code; extending the local application using known plug-in or extension mechanisms; dynamically linking in shared libraries; and the like. Each of these solutions may have advantages and disadvantages based upon how easy it is to integrate into the application to be remote-enabled. For example, injecting code, which typically involves rewriting compiled code to redirect function calls to another location (where alternative code sequence is defined). Tools that analyze for security flaws are not typically meant to operate on this level because they are typically employed to analyze source code. In addition, it is easy to introduce incompatibilities when versions change.

Once the secure connection 120 is established, the general flow of data between the local application 120 and the isolated execution environment 103 is that client device local application 105 input, such as keystrokes, mouse and other cursor and input events is intercepted by the remoting code previously integrated into the local application 105 and forwarded to the remote application instance 103 via the secure connection 120. The remote application instance 103 then performs whatever execution is being requested, including, for example, downloading web pages or content via a third party website 130, applying stylesheet definitions (.css), and executing JavaScript for web browser applications, to generate rendering output. The rendering output is then packaged, including optional encoding, optimization, and enhancing, and forwarded via the secure connection 120 back to the local application 105 to be rendered on a display of the client deice 104a using the remoting code previously integrated into the local application.

Local input to the local application 105 (for example, user keystrokes, mouse clicks, local media streams, file transfers, or other inputs) are provided to the remoting orchestrator 102 over the secure connection 120. Responsive to a trigger event (for example, a form submit event, a predetermined number of keystrokes, a predetermined number of keystrokes that satisfy requirements for variety of character types, or other events), the remote orchestrator 102 evaluates one or more inputs provided by the local application 105 to determine whether the one or more inputs include candidate sensitive information. The evaluation is preferably limited to situations where the user attempts to provide the inputs to non-whitelisted targets, such as websites or email addresses that are absent from one or more whitelists. The evaluated inputs are preferably limited to inputs of interest, such as credential field values (e.g., values of password fields, username fields, or other fields), transferred files, media streams, or other inputs. The remote orchestrator 102 preferably determines whether the evaluated inputs include candidate sensitive information by determining whether the evaluated inputs comply with requirements for actual sensitive information (for example, password requirements such as length, character types, or other requirements).

The remote orchestrator 102 typically generates a secure version of the determined candidate sensitive information (for example, a hash value) and verifies the secure version with an authentication service of an enterprise with which the user is associated (for example, a company that employs the user). Responsive to the authentication service verifying that the candidate sensitive information includes actual sensitive information, the remote orchestrator 102 preferably executes one or more preventative solutions to prevent theft of the sensitive information. In some cases, the remote orchestrator 102 clears or modifies the values of the fields that are determined to include sensitive information before providing the field values to a target to which the user attempted to provide the inputs via the local application. Accordingly, not only does the ARAIS prevent infection of the client computing device 104a, yet the ARAIS also achieves the practical application of preventing theft of sensitive information while allowing the user to interact with any website, regardless of whether the website is whitelisted or blacklisted. Moreover, the ARAIS facilitates intervening only at the point when a user actually inputs sensitive information and allows the user to proceed with any target before and after that point without allowing the sensitive information to be provided to the target.

Multiple paths exist for directing the initial client communication to the remote execution web server 101 instead of directly to the target server associated with the initial client request. For example, using a web browser as an example local application, if the user runs a web browser and tries to open the "www.cnn.com" page, then this request must be somehow redirected to web server 101 instead. In some example ARAIS environments, this redirection is done transparently to an end user. For example, a system administrator in an enterprise may push a domain policy that configures a proxy client on all of its employees' machines to point to the remote web server 101. The enterprise might also employ a gateway that automatically routes all traffic to the web server 101. This solution would also work for an arbitrary application that uses protocols other than HTTP requests (such as any protocol built on top of TCP/IP or UDP). As another example, an extension may be configured for a browser that changes the browser's internal proxy settings to point to web server 101 or intercepts any URLs entered by a user of the client device 104a and reformats them to point to the web server 101. As yet another example, and useful generally for remoting applications transparently to the end user, code can be installed to intercept traffic at a network gateway and redirect it to the web server 101. Alternatively, this redirection can be performed manually. Different ones of these solutions may require different levels of configuration and result in different amounts of transparency to the end user.

Although the techniques of an Adaptive Rendering Application Isolation System are generally applicable to isolating any type of application, including web applications such as web browsers and more enterprise-friendly applications, one goal of the ARAIS is to provide an environment wherein the execution tasks of the application are performed in an isolated environment separate from where the output is rendered and the input is received. Further, transfer of the rendering output data from the remote application instance to the local application is performed using as high a level of rendering output as possible such that the fidelity of information is not lost and that rendering is performed on the local application with as small a data transmission size and as little latency as possible while providing a highly secure environment that minimizes security vulnerabilities. A higher level of graphics rendering data, such as using draw commands from a library such as SKIA or Cairo (which uses vector graphics), generally uses less bandwidth and a smaller size of transmitted data than transfer of lower level graphics, especially pixel transfers. As well, vector based rendering is more easily amenable to things such as scaling. Thus, it is often preferable to transport vector commands (draw commands), or even commands translated to a lower level in the graphics pipeline (such as using OpenGL, WebGL, DirectX, Vulkan, or other GPU commands) which draws in points, lines, and vertices and loses information such as curve information. These assumptions vary with need. For example, vector based rendering cannot easily represent high quality pictures (such as those taken from a camera) or video, so typically these types of data are 'passed through' and rendered as is (not as a vector image).

Although the examples described herein often refer to an application (e.g., an application) based upon the (open source) Chromium browser engine and technology, the techniques described herein can also be used by other browser engines and with graphics libraries other than SKIA. For example, the techniques described herein may be applicable to any application that renders using the SKIA graphics library or that is based upon Chromium, including but not limited to Electron based applications, such as Slack, Microsoft Teams, or Skype, to name a few. In addition, the techniques described here may be applied to Android applications that render to SKIA, although modifications may be required to intercept SKIA commands. Also, similar techniques may be used with other vector graphics libraries such as Cairo (used by WebKit based browsers and web applications). In addition, when application source code is available it is possible to enhance the application more easily to accommodate ARAIS isolation mechanisms. Yet, even when source code is not available, isolation-enabled applications can still be made possible by hooking draw calls of existing applications to intercept the graphics to render output in an ARAIS compatible format which can be determined by running and analyzing applications (either manually, automatically or a mixture of using a computer and manual analysis) to determine their rendering pipeline. In a more difficult case (or where the tradeoffs indicate that pixel data is the best option, for example for performance or quality), pixel pushing can be resorted to. Further, ARAIS can employ an adaptive remoting scheme based upon a rules engine that incorporates potentially dynamic factors as described further below with respect to FIG. 7. So, for example, applications that use GDI can also be isolation-enabled by capturing and forwarding rendered output at the level of GDI calls using an open source version of GDI or using a compatible library (which can be compiled and run as well on the local application).

Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures, and other support to implement an Adaptive Rendering Application Isolation System to provide a more secure environment for running applications. Other embodiments of the described techniques may be used for other purposes, including for enhancing performance of remotely executing applications. In the following description, numerous specific details are set forth, such as data formats and code sequences, etc., in order to provide a thorough understanding of the described techniques. The examples described also can be practiced without some of the specific details described herein, or with other specific details, such as changes with respect to the ordering of the logic, different logic, etc. Thus, the scope of the techniques, block descriptions, and/or functions described are not limited by the particular order, selection, or decomposition of aspects described with reference to any particular routine, module, component, and the like.

Figure 2:
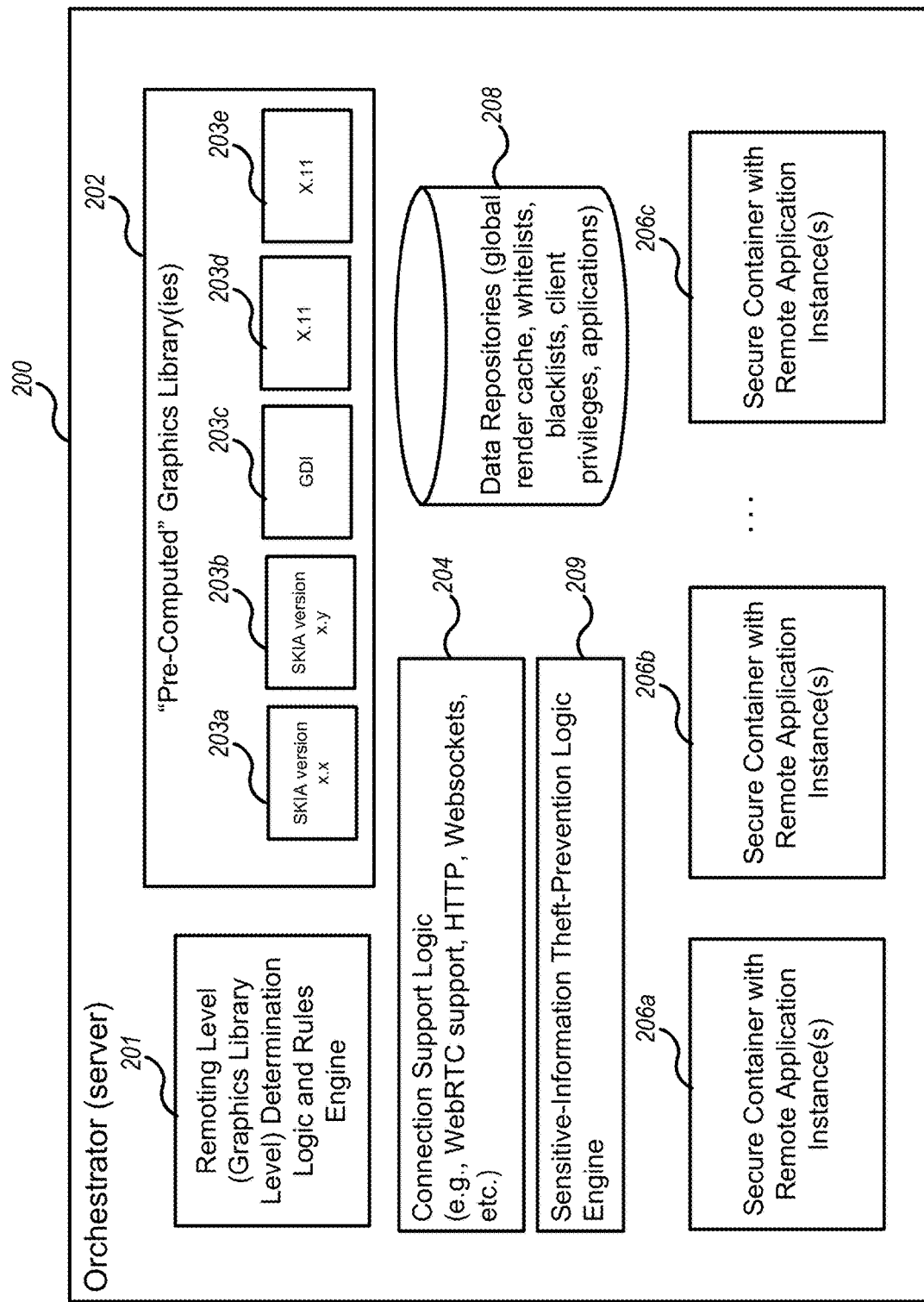
FIG. 2 is an example block diagram of components of an example orchestrator server computing system for performing application isolation with sensitive-information theft prevention in an example Adaptive Rendering Application Isolation System.

FIG. 2 is an example block diagram of components of an example orchestrator server computing system for performing application isolation in an example Adaptive Rendering Application Isolation System. In one example embodiment, an orchestrator server (such as Remoting Orchestrator 102) comprises one or more functional components/modules that work together to deliver remote-enabling technology to client applications. For example, an orchestrator server 200 may comprise remoting level determination logic and rules engine 201; pre-computed graphics libraries 202 or other rendering logic such as different versions of SKIA, GDI, X11, etc. (203a-e); connection support logic 204; data repositories (storage) 208 for objects such as a render cache, whitelists, blacklists, client privileges, and application information; and one or more secure containers running remote application instances.

The connection support logic 204 is responsible for making a secure connection (such as connection 120) to each client application that is requesting a remote-enabled application (e.g., web browser) either explicitly or transparently and for communicating with the load balancer 106 of the web server 101 to initiate a remote-enabled application. The connection support logic may be implemented for any type of secure connection over a network/Internet, including for example WebRTC, which provides peer-to-peer connectivity, and/or WebSockets, which uses TCP and provides client/server style connectivity. Other protocols can be similarly implemented.

The orchestrator 200 is also responsible for pre-computing rendering code 202 for delivery to local applications that are to be remote-enabled. In other examples, the rendering code 202 is generated offline during a building process in which a graphics library is compiled, and the orchestrator 200 delivers the compiled library to the client. In one example ARAIS, the "pre-computed" rendering code 202 is pre-compiled to WebAssembly (.wasm) files. Other versions of the ARAIS may include other "pre-computed" formats of graphics rendering code using, for example, "asm.js," a subset of JavaScript. For non-web-based applications and others, these pre-computed formats may be written in other languages and using other formats. These pre-computed files contain the code that is integrated into the client (local) application to remote-enable an application so that it comes "isolation-ready." Libraries 202 can include other types of rendering code libraries other than what are shown in files 203a-e. For example, they can include code that renders pixels, video, WebGL, OpenGL, etc. The pre-computed rendering code is delivered to a requesting client application when the ARAIS web server needs to remote-enable an application. This code is delivered to the local application "on demand" so that it can contain exactly the same version as what is being used to render on the isolation execution environment (the remote application) side. This insures compatibility between the isolation execution environment and the local rendering environment even between different versions of the application or libraries. For example, in C++, preprocessor defines are typically used to influence program behavior at build time, and the precompiled rendering code can be built with the same settings that would have been used on the server to ensure that the same code is executed during the rasterization process on the client computing device that would traditionally happen on the server. In effect, everything rendered on the client device is rendered the same as on the execution environment. This is distinct from solutions such as RDP which do not guarantee that what is rendered on the local desktop is consistent with what is rendered (computed to be rendered) remotely. For example, if the remote server is using a different version of GDI than the client device, then the computed rendering output to be displayed on the client device may look different than what was computed, which could lead to annoying behavior or even look like defects. Using the ARAIS techniques, a Chrome browser, for example, which uses the size of the font to compute layer information, will calculate a same result on the isolation execution environment as on the client device. Having different versions of pre-computed libraries, such as 203a and 203b, allows the orchestrator 200 to accommodate different client computing systems and/or users without the application/browser having to concern itself with compatibility between versions. In some cases, the local application may be an isolator application that is preconfigured to be remote enabled by already having programmed therein one or more of the features described herein.

In some scenarios it may be desirable that the rendering code in the execution environment remote application instance is different than the rendering code sent to the client. These scenarios also can be accommodated by the ARAIS techniques.

The remoting level determination logic and rules engine 201 is responsible for determining the logic and/or files to forward to the client computing system to remote-enable an application. It is also responsible for determining the "level" of rendering interception and hence the characteristics of a corresponding remote application to be instantiated 206a-c for intercepting rendering calls to forward rending output at the determined level. As discussed further below with respect to FIGS. 4, 7, and 8, this determination may be based upon any one or more characteristics of the client device, the local application, as well as the user, or other factors. Further, this determination may be made manually, automatically by the orchestrator, or a mixture of both. In some instances, it may include a rules engine which uses machine learning tools to determine the appropriate graphics level for interception and logic/files to forward to the client computing system to remote-enable an application.

Once a determination of appropriate rendering interception level is determined, the orchestrator 200 is responsible for instantiating and containerizing a remote application instance such as in secure containers 206a-c. In one example ARAIS, each secure container 206a-c is a Docker instance (a secure container), which operates as a lightweight virtualization mechanism because it shares a single operating system kernel across all containers. In order to provide the desired isolation, there is at least a separate container and remote application instance for each local application process of a single client. Thus, for example, a web browser with multiple tabs (or what resolves to a single application process) associated with a first client computing device will execute in container 206a, whereas a browser associated with a different client computing device or another running browser process in the same client will execute in container 206b. In other configurations, a separate container is instantiated for each tab as well to provide an even great level of security. One advantage to using a single secure container for all tabs of a web browser application, is that the user experience between tabs can be shared. Upon instantiating and creating a secure connection to the client computing system, a "cookie" or similar identifier or tag is used to identify the client-application process pair. This identifier is then used by the orchestrator 200 to identify the appropriate container when a new tab for an existing process, for example, is launched.

The orchestrator 200 uses data repositories 208 to store a variety of information. In a system that supports web browsers or other web applications (that request content using URLs), one such item is a rendering output cache that stores, for example, frequently visited web pages. This cache of pages can speed up the rendering process for all clients taking advantage of multiple client behaviors across usages. Pages that are visited more frequently can have their corresponding rendering output data (such as drawing command quads) cached for quick recall. In addition, the cache can be tailored to weight the storage of rendering output corresponding to particular web pages based upon certain characteristics like the importance of a user within an enterprise, frequency of use, or other factors. In addition to caching on a per orchestrator instance, each secure container may cache its own rendering output data using a local cache as described below with respect to FIGS. 3A and 3B.

In addition, the data repositories 208 may be used to store other information related to performance and/or security of the execution environments running in the secure containers 206a-c. For example, repositories 208 may store whitelists and/or blacklists of users, third party websites or content, privileges associated with client computing systems and/or users, and application information for applications that are able to be remote-enabled. Other information may also be stored.

The sensitive-information theft-prevention logic engine 209 is responsible for identifying sensitive information provided from the client computing devices, such as client computing devices 104a-d. It is also responsible for preventing the identified sensitive information from being provided to non-whitelisted targets, such as websites or email addresses that are absent from one or more whitelists. As discussed further below regarding FIGS. 10-13, the identification of sensitive information may be based on evaluating one or more field values by comparing the one or more values to values stored in a sensitive-information database responsive to detecting an event, such as a form submit event. Accordingly, as shown in FIG. 2, one or more portions or actions of the sensitive-information theft-prevention logic engine 209 are executed outside of the secure containers 206a-c to identify and potentially filter sensitive information from the client computing devices before it is passed to any of the secure containers 206a-c because the secure containers have the potential to become compromised by malicious attackers, as discussed further below regarding FIGS. 3A and 3B. In some cases, one or more portions or actions of the sensitive-information theft-prevention logic engine 209 may be executed on one or more different computing devices, such as a client computing device 104*a-d*. For example, one or more portions of the sensitive-information theft-prevention engine 209 may be provided to the local application 105 in or with one or more remote-enabling files or may be pre-programmed in the local application 105 in the case of it being an isolator application. In some cases, as discussed further below regarding FIGS. 3A and 3B, one or more portions or actions of the sensitive-information theft-prevention logic engine 209 may be executed in one or more of the secure containers 206*a-c*.

Figure 3B:
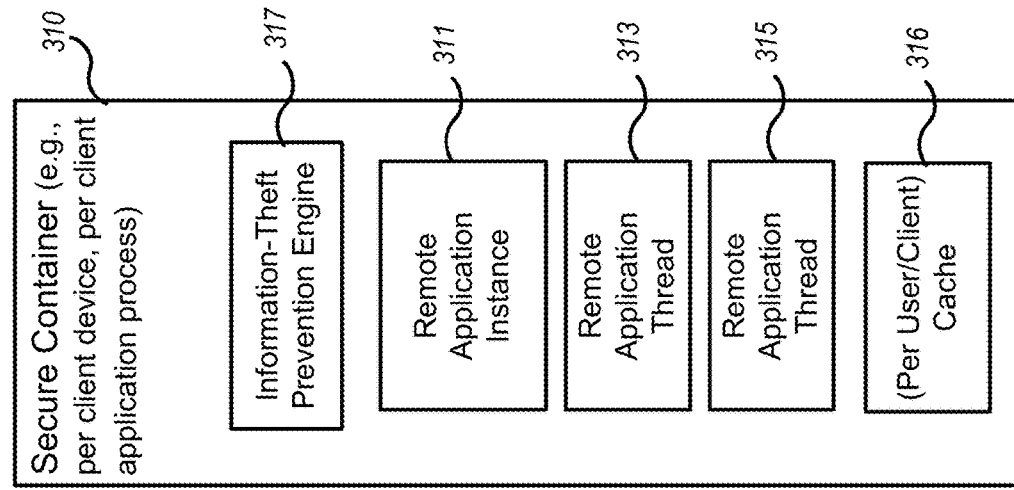
FIG. 3B is an example block diagram of an isolated remote application instance with an example information-theft prevention engine running in an example execution environment of an example Adaptive Rendering Application Isolation System.
Figure 3A:
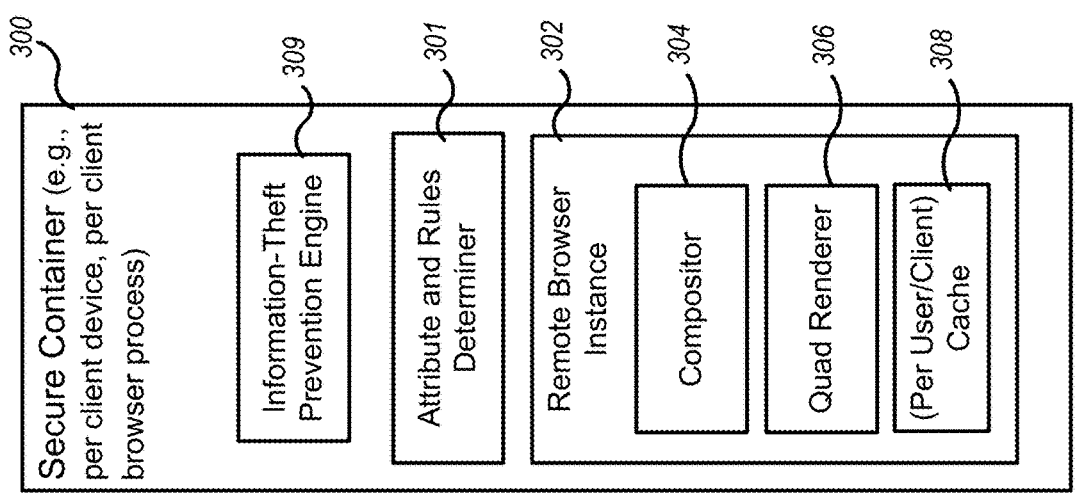
FIG. 3A is an example block diagram of an isolated remote browser instance with an example information-theft prevention engine running in an example execution environment of an example Adaptive Rendering Application Isolation System.

FIG. 3A is an example block diagram of an isolated remote browser instance running in an example execution environment of an example Adaptive Rendering Application Isolation System. As explained with respect to FIGS. 1 and 2, secure container 300 provides an isolated execution environment for a corresponding remote instance of a web browser running on a client computing system. Separating the execution actions of the web browser from the rendering allows the ARAIS to minimize vulnerabilities potentially caused by downloading web pages or content via a third party website, execution of code such as JavaScript (embedded or as separately provided as a downloaded code file) or applying stylesheet definitions (.css). Any malicious tinkering with the executable code in the remote browser instance is then restricted to affecting the secure container. Further, when the client web browser exits, the secure container is removed so that any malware is not perpetuated by the orchestrator server. For non-web-based applications, separation of code execution provides similar benefits.

In an example ARAIS, secure container 300 contains an attribute and rules determiner 301 (module, engine, code logic, or the like), and a remote web browser instance 302 which corresponds to the intercepted request for a page by the client web browser as explained with respect to FIG. 1. This instance runs in the isolation environment provided by the secure container 300 to restrict any malicious code or effects from the remote browser instance 302 to that container. Thus, other client computing systems' remote instances are not infected by anything that may occur in instance 302. The remote browser instance 302 may contain one or more portions of rendering code, for example, compositor 304 and quad renderer 306, for rendering the output generated by the executing code. These portions of rendering code constitute a rendering (or graphics) pipeline and often differ between different web browsers such as those built on Chromium (which currently employs the SKIA library) versus those built on WebKit (which currently employs the CAIRO graphics library). Thus, the compositor 304 and quad renderer 306 represent placeholders for portions of code that are used in the remote browser's rendering pipeline.

Which remote browser instance 302 to instantiate in the secure container 300 is determined based upon the attribute and rules determiner 301. This determination is described further with respect to FIG. 4. In one example, when remoting Chromium based applications, an enhanced version of the Chromium browser is used. Because Chromium is open source, the rendering pipeline can be modified to accommodate the determined interception and remoting performed by ARAIS. Similar modifications can be made to any web-based application for which source code is available, although the logic and places for interception in the web-based application may vary and may be tuned for that application.

Figure 5:
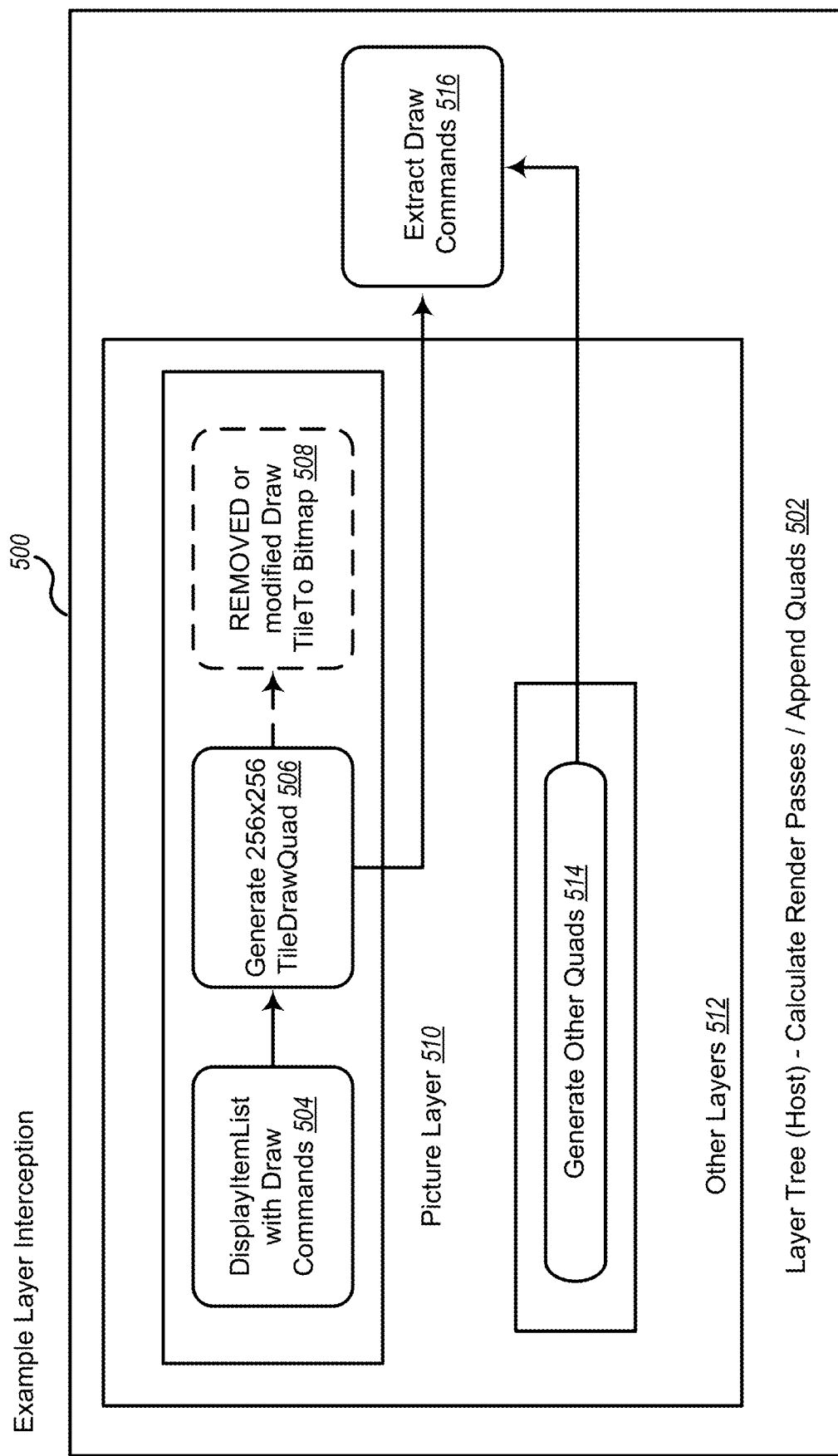
FIG. 5 is an example block diagram illustrating remote side code interception for adapting content in an isolated web browser application for delivery as draw commands to a corresponding rendering endpoint in an example Adaptive Rendering Application Isolation System.
Figure 6:
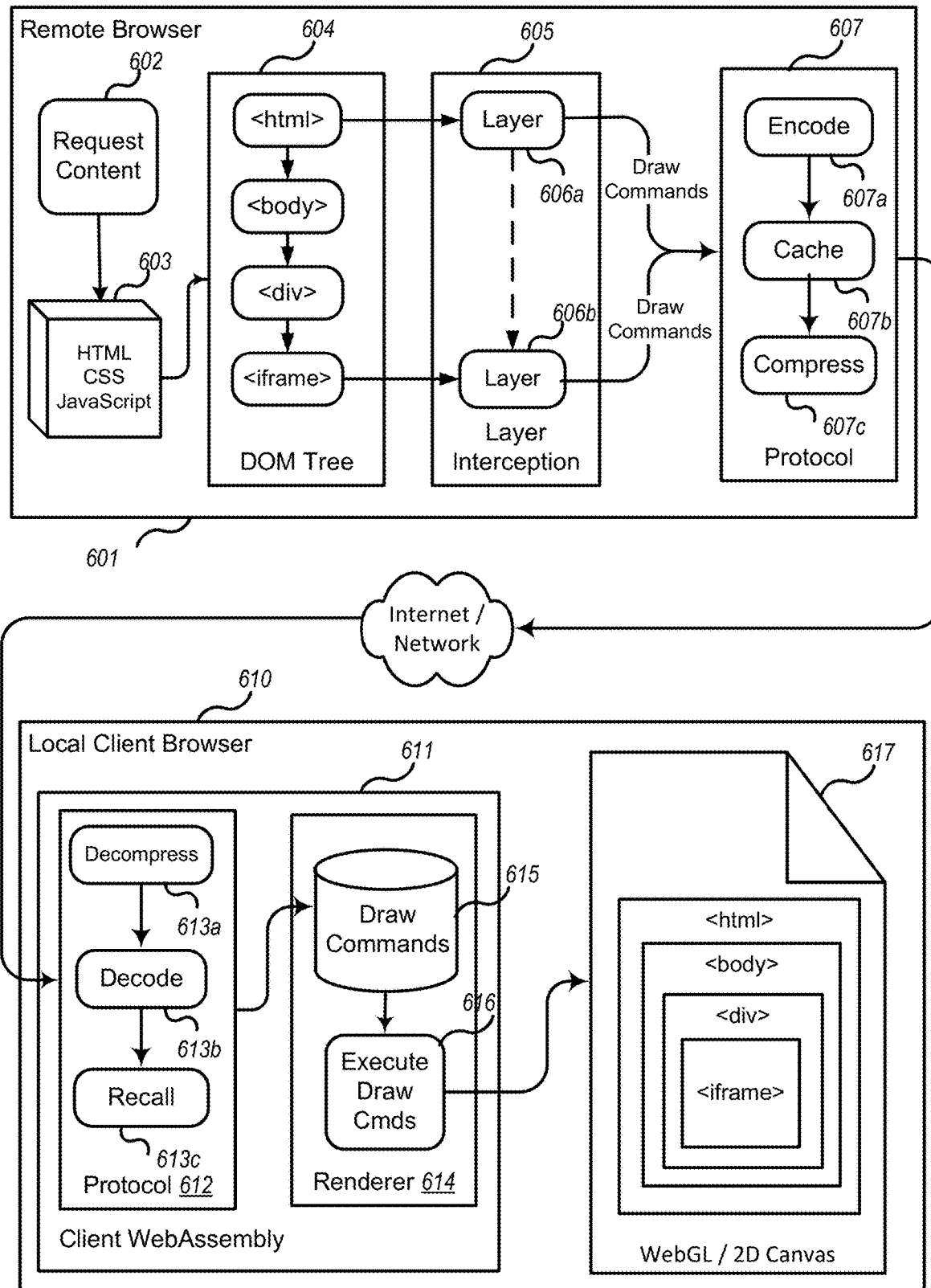
FIG. 6 is an example block diagram illustrating adapted web page data flow from an isolated web browser application to render a page on a corresponding rendering endpoint in an example Adaptive Rendering Application Isolation System.

For example, as described further with reference to FIGS. 5 and 6, in Chromium, the rendering output data may be captured before bitmaps are generated by the default Chromium rendering code. In one example ARAIS, the Chromium code is altered to capture the draw calls that relate to "tiles" that are being composited and would otherwise be rasterized (into pixels/bitmaps) and the draw calls for other quads (rectangles) produced during compositing. These occur in response to "executing" the layers produced as a result of the compositing process (traversal of the DOM produces a layout tree which is traversed by the compositor to generate a layer tree and ultimately a display list) to generate quads to be painted and then rasterized. Interception alterations are made to the default rendering pipeline to extract draw commands that correspond to the portions of the page that would otherwise be rasterized. This type of interception results in a system that can forward packets of drawing commands (high level of graphics interception) instead of pixel pushing. Other configurations can yield other optimizations and advantages.

Secure container 300 also contains a cache 308, which can store for example draw commands on a per user (or per client browser) basis for frequently accessed content, the initial site visited (the home page), and other frequently visited sites. In addition, the remote browser instance 302 may track resources that are cached on the corresponding client (local) browser, for example, by keeping copies in its own cache 308 or through other mechanisms.

In an example ARAIS, secure container 300 contains an information-theft prevention engine 309, which includes one or more portions or actions of the sensitive-information theft-prevention logic engine 209 or causes one or more portions or actions of the sensitive-information theft-prevention logic engine 209 to be executed in the secure container 300. This arrangement facilitates a new instantiation for the information-theft prevention engine 309 with each instantiation of a secure container and thereby facilitates instance-specific configuration of the engine 309, with a tradeoff of the engine 309 potentially being exposed to compromising code or actions in the secure container 300. Instance-specific configuration provides benefits such as facilitating simpler loading of rules specific to the user or the client computing device, as discussed further below regarding FIGS. 10-13. As shown in FIG. 3A, the information-theft prevention engine 309 executes independently of the remote browser instance 302. In other cases, one or more portions of the information-theft prevention engine 309 are included in the remote browser instance 302, either by pre-configuring or programming the remote browser application corresponding to the remote browser instance 302 or by providing an extension or plug-in to the remote browser instance 302.

FIG. 3B is an example block diagram of an isolated remote application instance running in an example execution environment of an example Adaptive Rendering Application Isolation System. Secure container 310 is similar to container 300, but contains one or more instances of remote application instances 311 depending upon the level of security between applications desired. In some cases, multiple threads 313 and 315 of the application instance 311 run in the same secure container 311. In other cases, each thread 313 and 315 is instantiated in its own secure container 311. The level of graphics interception and the various components of the graphics rendering pipelines are not shown as they could vary significantly from application to application. Techniques for such determination are described with reference to FIGS. 7 and 8. Secure container 310 also can contain a per user/per client cache 316 similar to that described for cache 308, but not specific to web based applications. Cache 316 may contain frequently used application resources for example. Information-theft prevention engine 317 is configured to operate in the same or similar manner as explained regarding information-theft prevention engine 309 of FIG. 3A.

Figure 4:
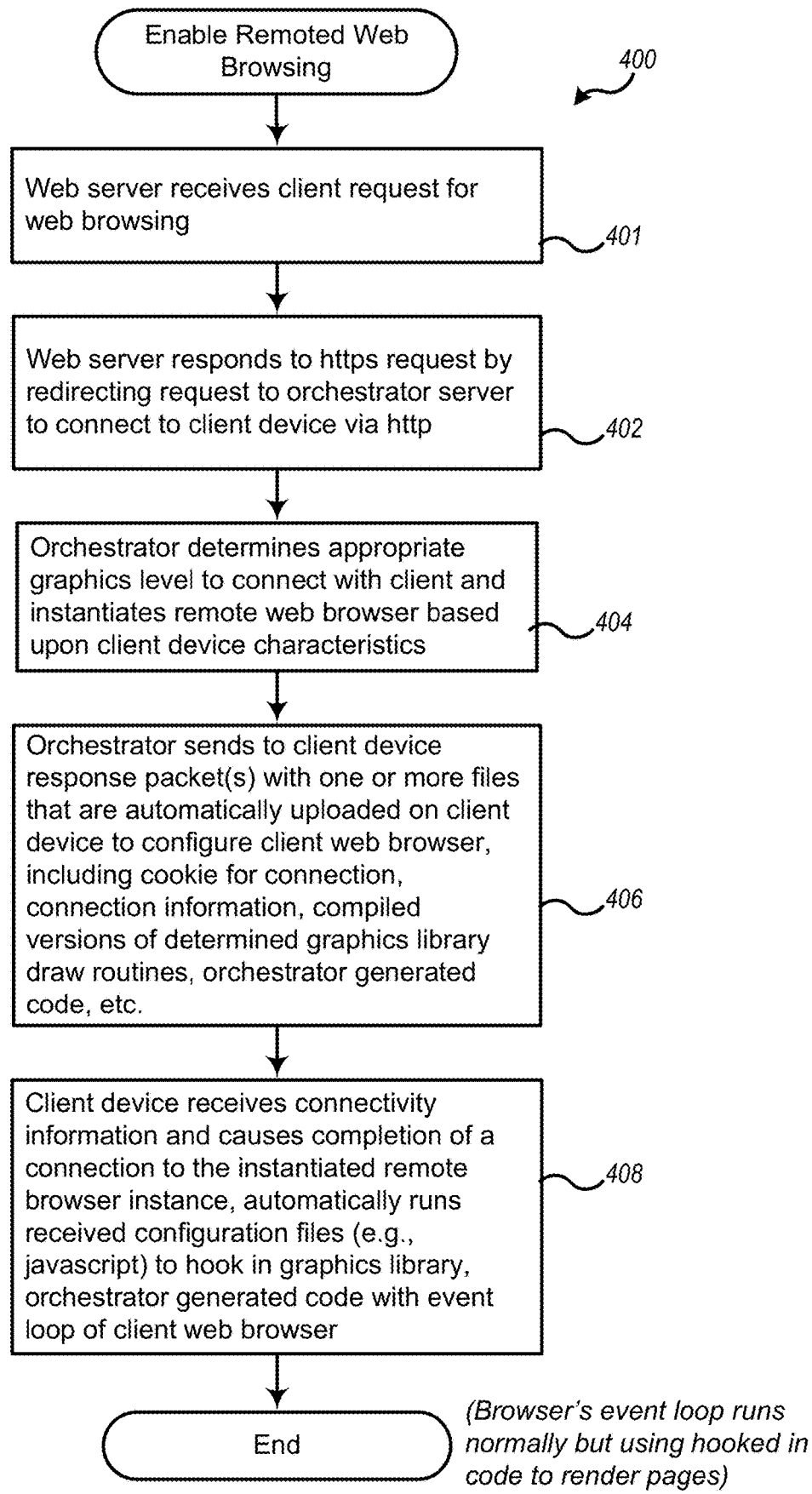
FIG. 4 is an example overview flow diagram of the logic for enabling an isolated remote web browser session using an example Adaptive Rendering Application Isolation System.

FIG. 4 is an example overview flow diagram of the logic for enabling an isolated remote web browser session using an example Adaptive Rendering Application Isolation System. In block 401, a web server (for example, Web Server 101) receives a client request for web browsing from a client computing device (for example, one of client computing devices 104a-104d). The request is preferably an HTTPS request. The request may be initiated by the user visiting or logging into a particular web page that transmits or forwards the request to the web server. For example, an administrator associated with the client computing device (also referred to as an endpoint) may configure settings associated with a network on which the client computing device resides to automatically redirect browsing requests to the web server. The request typically includes one or more of: a URL associated with a web page that the user intends to browse, an indicator of an operating system of the client computing device, an indicator of a type of browser or other application through which the user initiated the request, an indicator of a current status or state of one or more caches on the client computing device or content in the one or more caches, an indicator (e.g., a cookie) that identifies whether the user or client computing device is associated with one or more browsing sessions contemporaneously executed on the web server or previously executed on the web server and now terminated, or an indicator of one or more portions of settings or configuration information of the client computing device, the browser or another application on the client computing device, or the network in which the client computing device resides (for example, IT network administrator settings or configurations).

In block 402, the web server (such as Web Server 101), using load balancer 106, redirects the HTTPS request to an orchestrator server (such as Remoting Orchestrator 102) to respond to the client computing device's request for the web page via HTTP. The load balancer typically converts the HTTPS request to HTTP to communicate with the orchestrator server.

In block 404, the orchestrator server determines the appropriate graphics level to use for transporting rendering data to the client computing device (see, for example, FIG. 7) and instantiates a remote web browser application in a secure container (such as secure containers 206a-c) based upon one or more characteristics of the client computing device (for example, the client operating system, client application or version, network settings or configurations enforced by an IT network administrator for the network in which the client computing device resides, bandwidth of the connection with the client computing device, or others). The characteristics may be based on one or more portions of the request. For example, the orchestrator may determine a browser type or browser version of the client web browser application and may instantiate a remote web browser application that is the same browser type or version. As another example, the orchestrator may determine an operating system of the client computing device and may instantiate the container used to execute the remote web browser application based on the same operating system. Further examples include determining a graphics library type or version employed by the client web browser application or a state of a cached library on the client computing device and using these characteristics to instantiate the remote web browser application in the secure container.

In block 406, the orchestrator sends to the client computing device via an existing secure connection (e.g., the established HTTPS connection between the client computing device and the load balancer) one or more response packets based on the client request for the web page with one or more files or updates to the one or more files that are automatically integrated into the client web browser's standard code to configure the client web browser application through hooking, intercepting, code injection, etc., as described elsewhere. The one or more files typically include four objects: a JavaScript file, a rendering file such as a WebAssembly file (.wasm file), an HTML file, and a cookie. The JavaScript file typically is configured to interface with an application programming interface (API) of the client web browser application to cause the client web browser application to load and hook the rendering file into the event loop, is configured to intercept events from an event loop to listen for events associated with the client web browser application and invoke the draw handling code in the rendering file (for example, using callbacks from the browser's internal event loop), and is configured to initiate a secure connection (e.g., via WebRTC or other secure connection) from the client web browser application to the remote web browser application. The rendering (WebAssembly) file typically includes the draw handling code in a compiled instance of a graphics library of the remote web browser application. The compiled instance of the graphics library is typically configured to cause draw commands to be rendered in the same manner on the client web browser application as on the remote web browser application to ensure consistent rendering on the client web browser application and on the remote web browser application. The HTML file is typically configured to cause the client web browser application to generate a drawing canvas, which if it incorporates HTML5, may interface to one or more GPUs. The cookie typically includes connection information to facilitate persistent remote browsing sessions with intermittent terminations of the connection (for example, shutting down the client computing device or closing the client web browser application and reconnecting to the same remote browsing session).

In other examples, one or more portions of the one or more files or updates may be embodied in one or more C++ files (and/or another programming language or file formats, such as JSON) that are provided to the client computing device to achieve the same or similar purposes. For example, the WebAssembly files may instead be provided as "asm.js" files using different tools to compile the respective drawing libraries for running on the client side. The orchestrator typically determines the one or more files or file updates based on one or more portions of the information evaluated or determined in one of the preceding blocks, such as block 404.

In block 408, the client computing device receives connectivity information and causes completion of a connection to the instantiated remote browser application (for example, the client may engage in a WebSocket exchange via the web server, including passing one or more private keys, to establish a WebRTC connection with the remote application instance), automatically runs received configuration files to hook in one or more graphics libraries in the client browser application, and automatically runs code generated by the orchestrator using an event loop of the client web browser application. The connectivity information is typically included in the one or more files or updates. The JavaScript file typically causes the client web browser application to pass events detected by the event loop of the client web browser application to the remote web browser application as messages. Examples of such events may include cursor movement, click events, keyboard events, scrolling events, or other user or browser actions.

After the one or more files or updates are loaded in the client computing device, the client web browser application is configured to rasterize visual output of the remote web browser application based on draw commands received from the remote web browser application without bitmap rasterizations of the draw commands. Accordingly, the user of the client computing device has a local browsing experience (low latency and low or zero artifacts) while the client computing device is completely isolated from malicious code associated with content loaded in the remote web browser application. In this manner, the process 400 provides the user experience benefits of DOM mirroring and the security benefits of pixel pushing, without the drawbacks of either of those approaches.

FIG. 5 is an example block diagram illustrating remote side code interception for adapting content in an isolated web browser application for delivery as draw commands to a corresponding rendering endpoint in an example Adaptive Rendering Application Isolation System. Block 500 represents modules of code logic in the standard (unmodified) Chromium rendering process to show one way to intercept draw commands at a high level of interception in the graphics pipeline. Because Chromium is open source, the rendering pipeline can be modified to accommodate the determined interception and remoting performed by ARAIS. Similar modifications can be made to any web-based application for which source code is available, although the logic and places for interception in the web-based application may vary and may be tuned for that application.

According to its standard behavior, Chromium separates a web page into a set of layers, that are traversed to eventually generate what is drawn on the screen. It uses SKIA as its software rendering library, which contains commands for vector based drawing. These layers are generally parts of the page that are separate—transformations on one do not typically effect the other. Title bars, scroll bar regions, sidebars, etc. are examples of this. Multiple types of layers exist, such as picture layer 510 and other layers 512. During compositing, each layer is processed by its own logic and thus may perform different behaviors and is responsible for producing "quads" which are rectangles ultimately rendered to a display device (using for example a GPU and associate graphics library like OpenGL) in a final position relative to the page. For example, the execution of the picture layer, typically eventually produces "tiles" or "tile quads" (e.g., 256×256 rectangles, a type of quad) which are rasterized to bitmaps for easy display and reuse. The picture layer generally produces the most rendering code based upon vector draw commands. As another example, other layer 512 may be a video layer which is responsible for rendering and decoding video and produces video quads. Another other layer 512 may be a background, which is a solid color layer than results in rendering a solid color quad. The quads corresponding to the layers are typically rendered in "stacking" or z-order. The standard behavior of Chromium's picture layer processing code loses the drawing command information that resulted in the bitmaps to be rendered, once the bitmaps are created. As explained, remoting bitmaps can increase the size of data forwarded to a client application as well as cause additional latency.

Example ARAIS configurations of the remote Chromium web browser intercept the layer tree produced by Chromium in one or more locations so as to capture all of the draw commands used to render the page. These commands are then potentially optimized, enhanced, encoded, augmented, compressed, etc. and forwarded using a secure connection (e.g., connection 120) to the local browser application. Typically, it is desirable that the remote web browser performs as much of the rendering work as possible for laying out the page (e.g., determining where text, images, etc. are located on the page—this includes, but is not limited to, measuring the area a block of text takes based on its font and text size). The browser's rendering path may be completed all the way up to the point where the web page is going to be drawn on the screen. This avoids incompatibility issues because the page is just drawn on the local web browsers based on the layout as calculated by the remote browser.

In the configuration illustrated in FIG. 5, block 500 shows interception at the picture layer 510 and generally for other quads 514 to extract the draw commands at the generation of TileDrawQuad 506 and in the generation of other quads 514 into extracted draw commands 516. The draw commands that are intercepted in block 506 are those that correspond to tiles being rendered—it is not all of the draw commands in the DisplayItemList. Other configurations may instead extract and forward the entire or a different portion of the DisplayItemList to the client browser. In one example configuration, the code for Draw Tile to Bitmap 508 is eliminated or altered to avoid the sending of the TileQuads to the GPU for rasterization. This alternative may result in memory and speed optimizations and thus lower latency in responding to the client.

In Chromium, interception can occur in a variety of ways, for example, by hooking messages called between the layers and, for example, by modifying code (such as when LayerTreeHost calls CalculateRender Passes and in the AppendQuads code for each layer 502). Interceptions can also be made at other points in the code, in one or more portions or without preventing the rasterization of tiles to bitmaps. For example, instead of extracting the draw commands during the compositing process, they could instead be extracted prior to compositing and the work to perform compositing done on the client side. This would result in less compute time for the remote browser, but would require compilation of more of the rendering pipeline code placed into the (WebAssembly) file delivered to the client side browser to remote-enable the browser. Additional optimizations may be made to the modified rendering pipeline described for Chromium. For example, the layers produced by Chromium could be divided into smaller portions, and extracting draw commands corresponding to only the portions that are currently visible.

Similar techniques to those described also may be used with other web browsers. For example Safari's browsing engine uses the WebKit renderer which makes calls to the Cairo vector rendering library. These drawing calls could be intercepted in a similar manner to that shown in FIG. 5.

FIG. 6 is an example block diagram illustrating adapted web page data flow from an isolated web browser application to render a page on a corresponding rendering endpoint in an example Adaptive Rendering Application Isolation System. As shown and discussed with respect to FIG. 1, remote browser 601 is connected to and communicates with local client browser 610 over a secure connection (such as secure connection 120). After the local browser 610 has been remote-enabled and become isolation-ready through the integration of compiled code received from the orchestrator server (e.g., server 102), for example, in the form of a WebAssembly file, then input to the client device, such as such as keystrokes, mouse and other cursor and input events, can be captured from the standard browser input calls by "registering" callbacks (event listeners) into the delivered compiled code for these input events. The receipt of such event information (e.g., key value, mouse position, etc.) is then forwarded by the integrated code to the remote browser 601 across the secure connection. The remote browser 601 then performs whatever actions are necessary based upon the received input and renders output data.

Additionally, the remote browser 601 could also look for other relevant input events when it is aware of the structure of the page, for example, by having access to the DOM tree. In this case, the remote browser 601 could hook into code right before button input is processed. For example, the remote browser 601 could perform specialized actions upon receiving notification that the submit button (on a form) is depressed and provide a before-processing hook or an after-processing hook as desired.

The blocks of FIG. 6 illustrate how the process of rendering output by the remote browser 601 includes modifying and transmitting back to the local browser 610 output information (for example, draw command information and corresponding position information) to be handled by the integrated (WebAssembly) code 611 (remoting engine 611 facilitates extraction of remotely acquired draw commands from incoming messages and rendering of corresponding graphics via the local applications graphics engine (e.g., Renderer 614)) which is then rendered to a canvas, such as the WebGL canvas 617. The WebGL canvas 617 also may be provided to the local browser when it is being remote-enabled by the web server. HTML5 canvases have the added benefit of being able to incorporate GPU acceleration.

Specifically, in block 602, while executing a page, a request for content is made by the remote browser 601. This content is typically received, for example by a third party content provider (e.g., based upon a URL) such as third party website 130 in the form of HTML, CSS, or Javascript 603. The remote browser 601, in block 604 builds the DOM tree for the received content through its normal processing and produces a series of layers 606*a-b*. In one example remote browser 601, the layer code for layers 606*a-b* is intercepted, as described above with respect to FIG. 5, to extract draw commands for what is to be rendered based upon the content and potentially the current viewport (what is currently visible). These draw commands correspond to the quads that would normally be rasterized and sent as bitmaps to the local browser 610 if one were to use pixel pushing technology. The remote browser 601 then potentially encodes the rendering output (the draw commands for quads to be rendered) in block 607*a*, caches desired encoded rendering output in block 607*b*, and compresses the encoded output in block 607*c*. This encoding, caching, and/or compressing can be performed according to a protocol 607 to be used to transport the rendered output across the secure connection.

In some example remote browsers 601, this protocol is proprietary. Other example remote browsers 601 use known remoting marshalling and unmarshalling procedures and known ways to encode, optimize, and/or compress data. For example, one remote browser 601 uses Google Protocol Buffers to apply compression to the draw commands and uses gzip or other similar compression technique to minimize the size of the data being transmitted. Each draw command is embedded in a message that contains the minimal amount of data needed to replicate that draw command on the local browser 610. For example, images and fonts are only transferred once and stored in a cache identified by an identifier on both the remote and local computing systems. Thereafter, use of the font/image resource will be transmitted using only the identifier, and then recalled from the local browser's cache later. Identifying images and other content that is reused early in the remoting process allows for optimal compression and caching of content. Alternatively, images and other content may be transmitted to the local browser 610 in their original requested/downloaded form.

The corresponding protocol 612 on the local browser side 610 is also either a proprietary protocol or uses known remoting marshalling and unmarshalling procedures and known ways to decode, decompress, and/or recall data such as in blocks 613*a-c*. Specifically, a cache on the local browser 610 (not shown) stores resources, such as images and fonts, that are reusable. Once the local browser 610 receives an identifier in one of the decode and decompressed (and depacketized) messages, it can retrieve the corresponding cached item from its cache.

While a web page is loading, additional caching can occur. For example, items not immediately visible on the page on the local client that would be visible if the content is scrolled can be cached ahead of time to reduce latency when scrolling the page. This is possible because draw commands are sent for an entire layer (or multiple portions of a layer when the layer is subdivided), which is more than what is just viewable using current viewport settings. Other information can also be cached. In addition, scroll bars may be locally simulated on the local browser 610 to reduce perceived latency by modifying the unpacketized (and decoded/decompressed) draw commands 615 received by the rendering code in the local browser 610 to additionally draw the scrollbars with them. The local browser renderer 614 then executes the modified draw commands 616 using the standard browser's rendering code (or ARAIS code in the integrated Web Assembly code 611) to render composited draw commands 616 to the WebGL or other canvas 617. Further, because the remote browser in the described configuration has access to all of the draw commands, it can inject additional commands or modify existing commands in the draw command sequence. Other configurations may modify the draw commands in other manners.

The techniques described with respect to FIG. 6 may also be incorporated in remoting applications that are not web browser based. For example, proprietary protocols can also be constructed to handle draw calls at the highest-level rendering library available for libraries other than SKIA to optimize bandwidth. If an application, for example used GDI then instead of sending the pixels that GDI produces, the GDI commands could be packetized and transmitted in a smaller amount of data.

Figure 7:
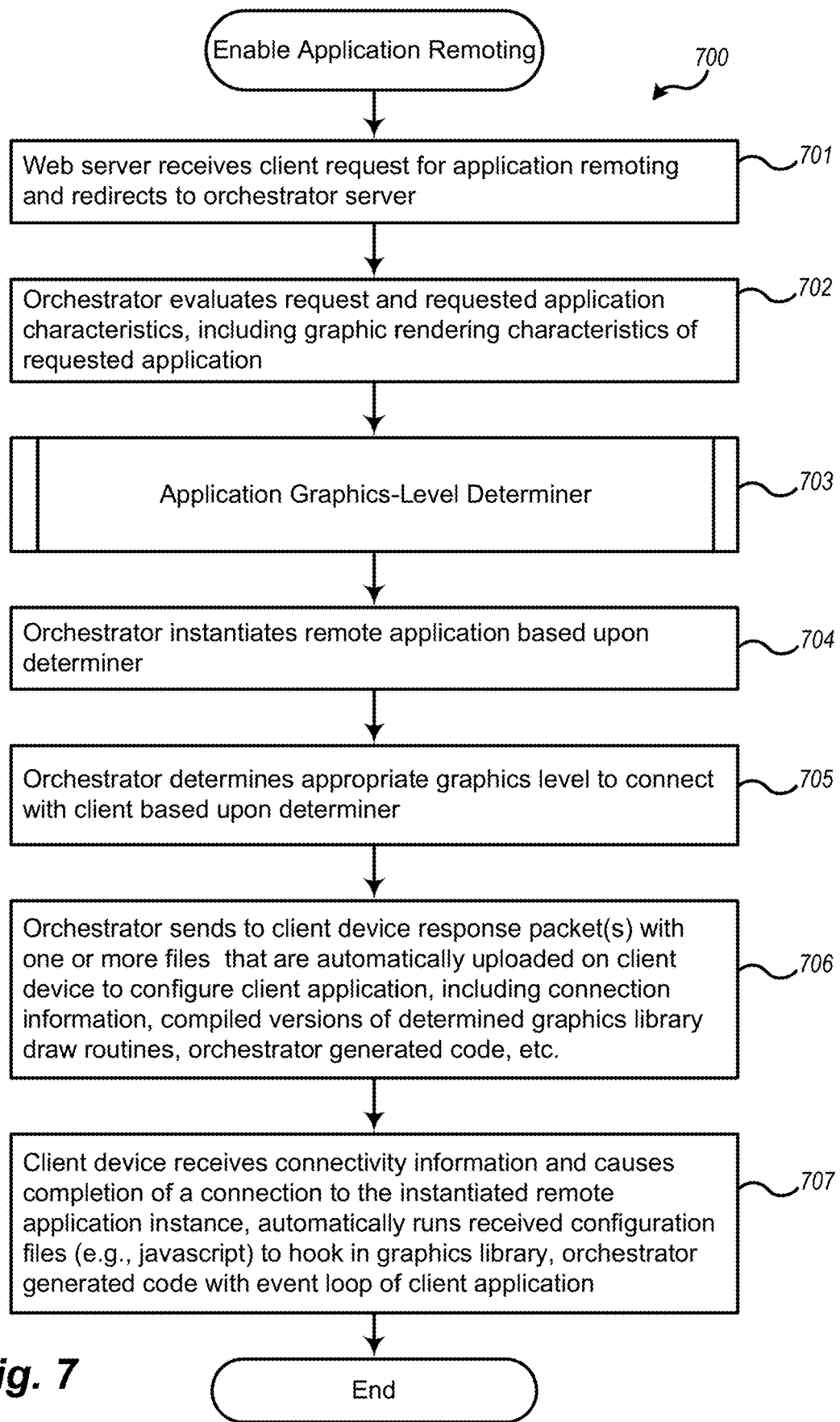
FIG. 7 is an example flow diagram of example logic for remote-enabling an isolated application using an example Adaptive Rendering Application Isolation System.

FIG. 7 is an example flow diagram of an example logic provided by an example Adaptive Rendering Application Isolation System to determine a level of data transfers and injection techniques for an application to be isolation-ready. This logic may be employed for all applications and not just web-based applications.

In block 701, a web server (for example, web server 101) receives a client request for application remoting from a client computing device (for example, one of client computing devices 104*a*-104*d*). The request typically includes one or more of the same or similar indicators as described regarding block 401 of process 400, including one or more of an indicator of an application or application type that the user intends to use or an indicator of an application or application type through which the user initiated the request. Also in block 701, the client request is redirected to an orchestrator server (such as orchestrating server 102) to respond to the client computing device's request for application remoting. The redirection is typically performed in the same or similar manner as described regarding block 402 of process 400.

In block 702, the orchestrator evaluates characteristics of the request and characteristics of the requested application. The request may include one or more characteristic indications, such as the application or application type that the client computing device intends to use to display the local rendering, the operating system of the client computing device, or one or more graphics engines or libraries included in or cached by the client computing device or the local rendering application. The request may also identify the application or application type that the user intends to remote. The application characteristics may include one or more indications, such as the identity of one or more applications or application versions available for the requested application or application type, one or more graphics engines or libraries included in each of those applications or application versions, whether those applications or application versions (or their graphics engines or libraries) are open source, or whether alternative graphics engines or libraries are compatible with those applications or versions or can be mapped to the graphics engines or libraries of those applications or versions. In some cases, the requested application may have previously been remoted by the ARAIS or may have been manually evaluated, and a data object (for example, a table) may include indicators of one or more of the application characteristics.

In other cases, the requested application may not have been previously remoted by the ARAIS, and, optionally, the request may include an executable file to install the application or may include an indicator of a location from which the ARAIS may retrieve the application, such as a URL. In those cases, the evaluation of the application characteristics can be performed in real-time. For example, the application may be installed in the remote environment, and a rules engine may execute rules to inspect the application files, APIs, or source or object code (for example, machine learning tools can crawl the accessible code or libraries, implementing guess-and-check attempts to hook into one or more portions of the files or code, recognizing file or code module names, or implementing other inspection techniques) to dynamically discover application characteristics. The determined characteristics may then be stored for future use by the ARAIS. If application characteristics are unavailable or unsuccessfully determined, default characteristics may be used until the application is manually inspected and the discovered characteristics used to overwrite the default characteristics. For example, if the graphics library or engine of the requested application is not accessible in real time, an equivalent or lower-level graphics library or engine may instead be used (either the highest-level engine or library accessible for the application or, if that is not accessible, an operating system level library or engine).

Figure 8:
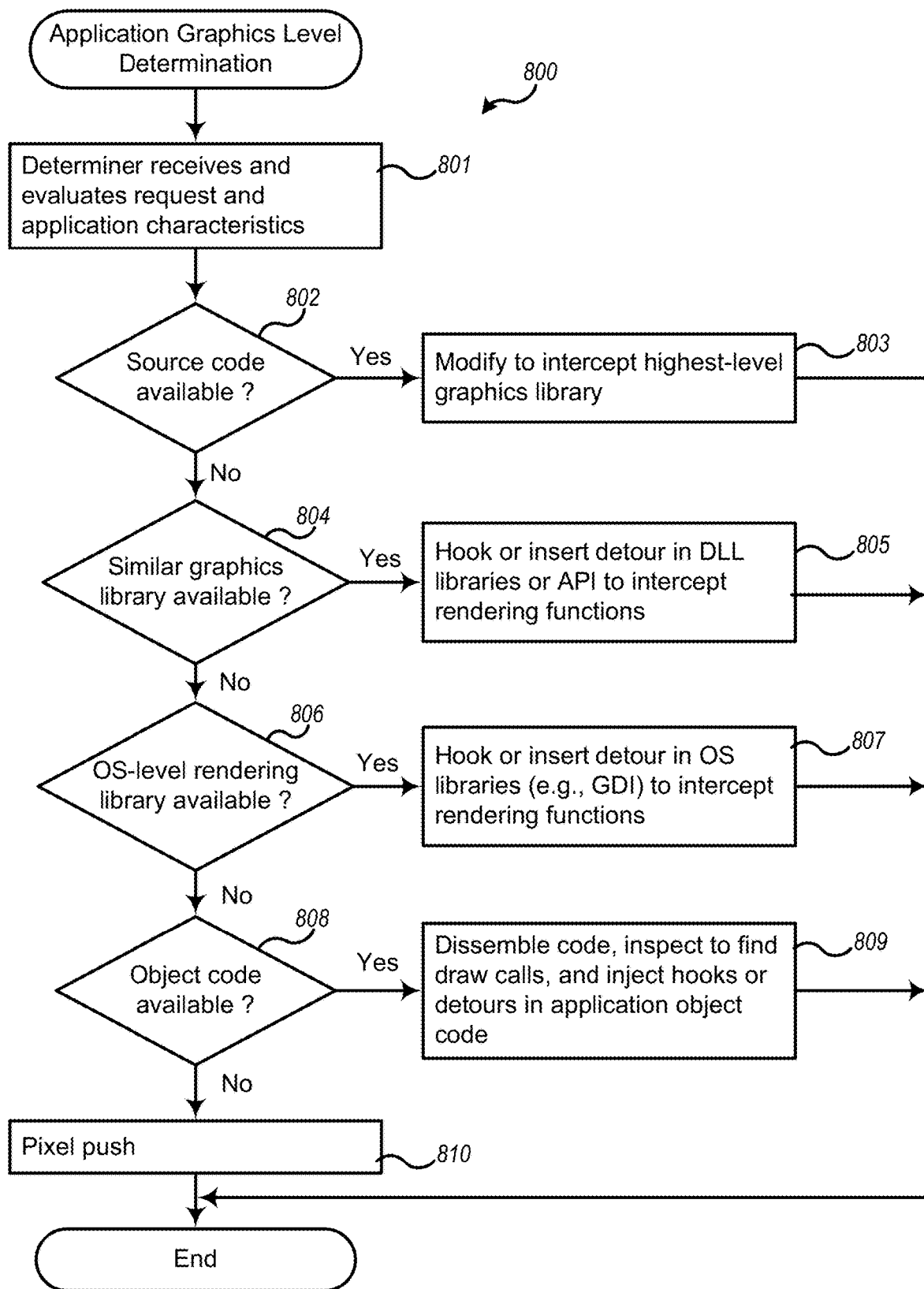
FIG. 8 is an example flow diagram of example logic provided by an example Adaptive Rendering Application Isolation System to determine a level of data transfers and injection techniques for an application to be isolation-ready.

In block 703, logic flows to the application graphics-level determiner to determine the appropriate graphics level to connect with client, as further described with regard to FIG. 8 because different applications may have different characteristics. For example, applications based on Chromium (for example, a Chrome browser application or Electron applications) or applications that employ SKIA libraries (for example, Chromium applications, Electron applications, or Android applications) typically have source code available (they are open source) with similar rendering architectures, whereas enterprise applications may have different rendering architectures (for example, Adobe Air applications use Flash for rendering, Adobe Acrobat uses a proprietary vector library for rendering, and Microsoft Office and Others use GDI for rendering). Accordingly, the mechanisms used to intercept calls and which files to generate and provide to configure the client application for application remoting may vary from application to application.

Generally, the highest-level rendering library within an application is preferably identified, accessed, and modified to include hooks or detours that facilitate intercepting draw commands and corresponding position information associated with that library. Examples of high-level graphics libraries include SKIA, CAIRO, and GDI, which are used by applications with Chromium, Mozilla, WebKit, or other engines. Within high-level graphics libraries, libraries based on vector-commands (for example, SKIA) are preferred over libraries based on commands that lose vector information (for example, GDI) because employing the vector libraries are less likely to result in intercepting rendering commands that involve pixel information, generally use less bandwidth, and generally cause less latency issues.

In block 704, the orchestrator instantiates a remote application in a secure container (such as container 103) based upon one or more portions of the request. One or more portions of block 704 are typically performed in the same or similar manner as described regarding block 403 of process 400. Before or when instantiating the remote application, actions are taken to obtain render commands and corresponding position information to facilitate providing such information to the client computing device based on the determinations of the application graphics-level determiner. One or more files, engines, or code modules are typically injected into or replace one or more portions of one or more files associated with the remote application to facilitate the determined manner of interception. For example, for open source engines or libraries, the code is typically injected into those engines or libraries as determined in block 703 to facilitate interception of the highest-level draw commands.

In block 705, the orchestrator determines the appropriate graphics level to connect with the client based on the determinations made by the application graphics-level determiner in block 703. One or more portions of block 705 are typically performed in the same or similar manner as described regarding block 404 and 405 of process 400. Typically, the highest-level appropriate library determined in block 703 is compiled (for example, as a WebAssembly file or asm.js file for browser applications that do not support WebAssembly, such as IE11) for use in rendering the intercepted commands (on the client side) unless pixel pushing is the only option. In some cases, where the graphics commands (for example, draw commands) in the highest-level appropriate library have been mapped to another library, the other library may be compiled for use in rendering the intercepted commands. For example, the remoted application, its graphics engine, or its graphics library may not be compatible with the local rendering environment (for example, the client computing device or the application or application type through which the user initiated the request) while the other library is compatible; the intercepted commands may be translated to the mapped commands in the other library (one to one, one to many, many to one, or many to many mapping); the other library may be compiled; and the mapped commands may be provided to the client computing device for use with the other compiled library. In some cases, the client computing device may already have the appropriate library files, and an update to the appropriate library files may be compiled.

In block 706, the orchestrator sends to the client computing device one or more response packets with the files or updates to the files. These files are automatically uploaded on the client computing device to configure the client application to perform the rendering process based on the one or more intercepted graphics commands, when it is possible to intercept them. One or more portions of block 706 are typically performed in the same or similar manner as described regarding block 406 of process 400. As with block 406 of process 400, the files may include compiled libraries of draw commands, sequences of draw commands (for example, stored procedures), or bitmaps that can be cached on the client computing device to facilitate rendering output from the remote application instance by sending identifiers that are logically associated with those draw commands, sequences of draw commands (for example, stored procedures), or bitmaps.

In block 707, the client computing device receives connectivity information and causes completion of a connection to the instantiated remote application, automatically runs received configuration files to hook in one or more graphics libraries to the local application's event loop, and automatically runs code generated by the orchestrator. One or more portions of block 707 are typically performed in the same or similar manner as described regarding block 408 of process 400; however not all applications have an accessible event loop or an event registration system, and other mechanisms for hooking in the rendering code may be needed such as by injection after inspection of the application. Blocks 705-707 may vary based on one or more of the client characteristics, such as the types of connections that the client computing device supports. The architecture described in FIG. 1 can be applied directly to Electron applications, for example.

After the files or updates are loaded in the client computing device, the client application is configured to render visual output of the remote application instance based on draw commands received from the remote application instance without receiving bitmap rasterizations of the draw commands. Accordingly, the user of the client computing device has a local application experience (low latency and low or zero artifacts) while the client computing device is completely isolated from malicious code associated with content loaded in the remote application instance. In this manner, the process 700 provides the experience benefits of DOM mirroring and the security benefits of pixel pushing, without the drawbacks of either of those approaches. Moreover, the ARAIS can dynamically remote applications. The logic then ends.

FIG. 8 is an example flow diagram of an example logic provided by an example Adaptive Rendering Application Isolation System to determine a graphics level of data transmission and integration techniques for an application to be isolation-ready. In block 801, an application graphics level determiner (for example, the remoting level determination logic and rules engine 201 or attribute and rules determiner 301) receives and evaluates characteristics of a client computing device's request (transparently or explicitly initiated) to remote an application and also receives characteristics of the requested remote application. The receipt and evaluation of the characteristics is typically performed in the same or similar manner as described regarding blocks 701 and 702 of process 700. Based on the evaluated characteristics of the request or the remote application, a manner of intercepting graphics information is determined to provide the highest level of interception based on the outcomes of decision blocks 802, 804, 806, and 808. One reason for attempting to intercept at the highest level of graphics is to allow the native application code on the client side to perform the details of the rendering yet transmit the lowest amount of data across the wire. This also typically results in less latency.

In block 802, the logic determines whether the source code of the remote application is available and, if so, continues to block 803; otherwise, the logic continues to block 804. In some examples, the remote application is open source or publicly available by other means. In other examples, at least a portion of the source code has been available through other mechanisms, such as a licensing agreement or an API.

In block 803, the graphics engines or libraries can be directly inspected or modified, and the highest-level graphics library of the remote application is modified to intercept and output called draw commands and corresponding position information to facilitate providing (forwarding, transmitting, sending, etc.) those draw commands to the client computing device. For example, draw commands for the application's highest-level library can be intercepted when executing the remote application instance, and the remote application can be modified to prevent rasterization of pixels to reduce expensive computations while still obtaining position information for the intercepted draw commands.

In block 804, the logic determines whether the graphics libraries of the remote application are unavailable yet one or more graphics libraries that are similar to one or more of the graphics libraries of the remote application are available and, if so, continues to block 805; otherwise, the logic continues to block 806. For example, a graphics library of the remote application may not be available, yet an open-source graphics library that is similar to the unavailable graphics library may be available. In some cases this assessment can be performed manually, yet in other it can be performed automatically by the computer, or a combination of manual and automated search for similar libraries can be performed.

In block 805, hooks or detours are placed in the remote application's dynamic link library (DLL) or other shared library files to intercept the remote application instance's rendering functions. In some cases, an open-source or custom-built equivalent engine or library can be implemented and used based on the intercepted rendering functions to facilitate intercepting draw commands and corresponding position information.

In block 806, the logic determines whether an operating-system-level rendering library is available (such as those used to remote desktop applications) and, if so, continues to block 807; otherwise, the logic continues to block 808. In some cases, an OS-level rendering library is always available. In other cases, the logic may determine that the OS-level rendering library is unavailable for the remote application based on its characteristics, such as output type, or based on the client characteristics, such as the client computing device having an operating system with rendering libraries that have not been mapped to the rendering libraries of the remote OS.

In block 807, hooks or detours are placed in one or more OS libraries (for example, a GDI library) or emulated OS libraries (for example, libgdiplus) to facilitate intercepting rendering functions. In some cases, an open-source or custom-built equivalent engine or library can be implemented and used based on the intercepted rendering functions to facilitate intercepting draw commands and corresponding position information.

In block 808, the logic determines whether object code for the remote application is available and, if so, continues to block 809; otherwise, the logic continues to block 810. In some cases, the application object code can be dissembled and inspected (manually, automatically, or both) to find draw calls in the dissembled object code.

In block 809, the dissembled object code is inspected in the same or similar manner as discussed with regard to block 702 of process 700. Hooks or detours can be injected in the application object code to facilitate intercepting draw commands and corresponding position information.

Finally, when no other options are available, in block 810, pixel pushing is implemented. For web based applications like SKIA, a renderer's compositor is essentially using the GPU to draw rectangular areas of the remote application output (e.g., all compositing layers, positioned relative to the viewport according to a layer tree's transform hierarchy) into a single bitmap, and the bitmap is captured as pixel information that can be passed to the client computing device. For other applications, for example those that use hardware rendering, transmitting the pixels may be the only option. The logic then ends.

Although the decision blocks are shown as being in a serial logic flow, they can be executed in parallel. In some cases, the logic evaluates the effectiveness of the action blocks 803, 805, 807, 809, and 810 that correspond to the positively satisfied decision blocks based on one or more of the client characteristics or remote application characteristics. The logic may execute rules or thresholds to evaluate performance data measured for the client computing device or the remote application for each of the evaluated action blocks to determine the effectiveness of the corresponding techniques and to determine an appropriate level for rendering interception.

For example, the determiner may determine that, based on the client computing device's operating system, local rendering environment, physical characteristics, or connection characteristics (e.g., bandwidth), one of the evaluated action blocks may provide superior results to one or more other evaluated action blocks. Some of the considerations that the logic evaluates to select one of the available blocks include pros and cons of each of the evaluated action blocks and their associated techniques. For example, intercepting the highest-level graphics library by inspection and modification of available source code is typically the ideal technique because of the benefits explained throughout this disclosure, without the drawbacks associated with and described for the other techniques. Breaking down an application's high-level drawing library and extracting the draw calls from the deconstructed library is unconventional, not well known, and not routine, as evidenced at least by the lack of competing products currently in the market using this technique. Transmission and/or compression of vector draw commands is also unconventional, not well known, and not routine.

Intercepting draw commands by hooking a process or otherwise using injection or detour techniques has a benefit of not requiring modification of source code of the remote application. However, these techniques can be challenging to maintain without compromising security. Hooks are typically made at the application level (for example, hooking drawRect in SKIA) and involve creating an external shared library (for example, .so file), forcibly loading the code into the executable of the remote application, and then rewriting the remote application's compiled call to the hooked call, and redirecting it to code that facilitates intercepting the call. The hooks will periodically break as the remote application is updated by the author or provider of the remote application. Injection of code involves rewriting compiled assembly (typically function calls) to redirect to another location, and the assembly is rewritten after loading, making it difficult to verify that all paths result in proper remote application behavior. Tools typically used to catch security flaws (for example, linters or static analyzers) cannot be easily run at the assembly level because this technique overwrites compiled code, and these tools typically run on source code, not overwritten assembly code. This leaves the potential for any modification to introduce a crash or a potential exploit.

Intercepting and providing intermediate render commands (for example, underlying OpenGL, WebGL, DirectX, Vulkan, or other render commands), rather than the highest-level draw commands within the remote application, has a benefit of being at a higher level than pixels and facilitates improved compression relative to pixels. However, intermediate render commands are at a lower level than vector rendering and, thus, will lose some information. For example, curves are lost because they are typically translated into a series of vertices and combined with compiled shaders to draw the curves. The compiled shaders and vertices are larger in data size than the original curves. Moreover, images need to be decompressed and put into a specific format that is consumable by the GPU, losing original information and compression.

Intercepting and providing operating-system level calls also do not require modifying source code of the remote application. However, because calls at this level are at a lower level than the highest-level draw commands within the remote application, some information is lost. This results in compressing images, damaged or dirty rectangles, and viewports of individual layers. For example, GDI often works with pixel data, and using SKIA to draw to a surface with GDI results in a loss of the SKIA vector information, which eliminates lossless scaling and requires more data to transmit the intercepted rendering command. Moreover, GDI is an optimization only on platforms available under the mark WINDOWS, unlike intercepted vector draw commands, which can be platform agnostic.

Pixel pushing is the lowest level of each of these options and requires the most amount of data to be transmitted across the wire.

Based on one or more of the client characteristics, it may be determined that one of the evaluated action blocks provides an experience to the user that most closely matches the native client environment, results in faster rendering on the client computing device, transmits less information across the wire to render a given remote application output (for example, pixel pushing requires sending more information than draw commands, even with advanced video and tiling compression because draw commands have a smaller footprint), or has lower latency (time due to computation or transmission of a given amount of data at a given bandwidth). An example of reducing computational latency is employing high-level draw commands over pixel pushing because this avoids video decoding and algorithms used for video smoothing (for example, jitter buffers), which in turn reduces client-side computations and facilitates less time consumption by the client computing device to display the remote application instance output.

Based on one or more of the remote application characteristics, it may be determined that one of the evaluated action blocks provides performance improvements on the server side, as compared to one or more of the other evaluated action blocks. For example, block 803 facilitates leveraging existing code (for example, code that provides the standard rendering process in the engine of the remote application, such as Chromium). Block 803 also facilitates compiling using rendering technology for the web (for example, WebAssembly or JavaScript). Hooking in at different levels in block 805 facilitates evaluating tradeoffs for different purposes, such as evaluating render commands, determining library level, and the like. Enterprise applications may use many frameworks (for example, ws widgets, Windows Prensentation Foundation (WPF), or others), which may require hooking into rendering code at a lower level, which may require more computational resources than other techniques. Some applications record a screen and do not necessarily invoke a graphics library at all, leaving block 810 as the only appropriate option. Accordingly, the user's experience can be optimized based on characteristics of the remote application and the client computing device while providing increased levels of security.

The hooking of interception code described in the logic of flow diagram 800 can be performed by a variety of possible known mechanisms, such as by callback mechanisms that take advantage of known or discovered architectures and attributes of the remote application; hooking known or discovered application programming interface ("API"); object code injection that replaces portions of the local application's executable code with a different portion of executable code; extending the remote application using known plug-in or extension mechanisms; dynamically linking in shared libraries; and the like. Each of these solutions may have advantages and disadvantages based upon how easy it is to integrate into the application to be remote-enabled. For example, injecting code typically involves rewriting compiled code to redirect function calls to another location (where alternative code sequence is defined).

Figure 9:
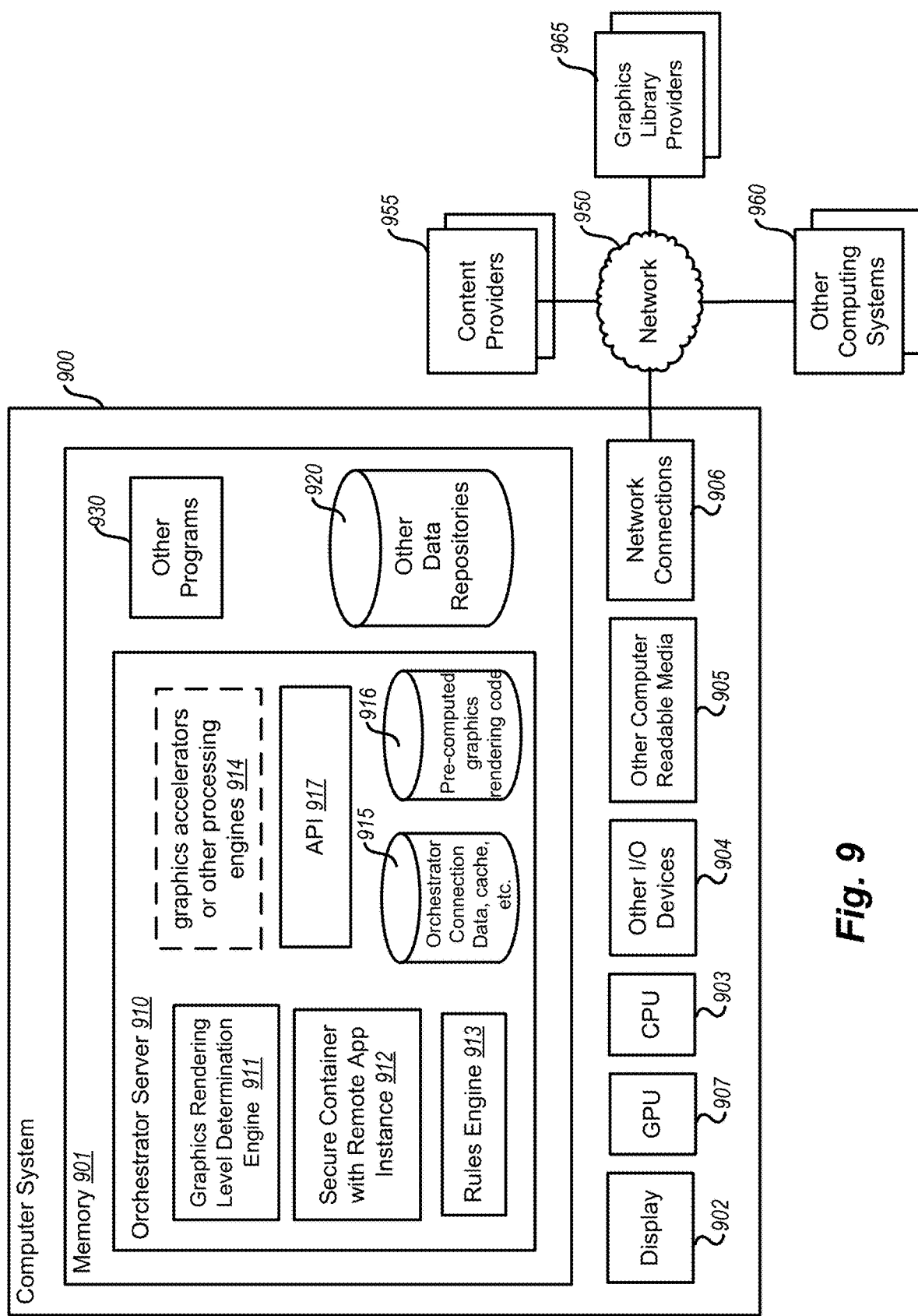
FIG. 9 is an example block diagram of an example computing system for practicing embodiments of an example Adaptive Rendering Application Isolation System as described herein.

FIG. 9 is an example block diagram of an example computing system for practicing embodiments of an example Adaptive Rendering Application Isolation System as described herein. In particular, this example computing system may be used to practice any one or more of the servers 101 and 102 or the client devices 104*a-d* illustrated in FIG. 1. Note that one or more general purpose virtual or physical computing systems suitably instructed or a special purpose computing system may be used to implement an ARAIS. Further, the ARAIS may be implemented in software, hardware, firmware, or in some combination to achieve the capabilities described herein.

Note that one or more general purpose or special purpose computing systems/devices may be used to implement the described techniques. However, just because it is possible to implement an Adaptive Rendering Application Isolation System or an isolation-enable application on a general purpose computing system does not mean that the techniques themselves or the operations required to implement the techniques are conventional or well known.

The computing system 900 may comprise one or more server and/or client computing systems and may span distributed locations. In addition, each block shown may represent one or more such blocks as appropriate to a specific embodiment or may be combined with other blocks. Moreover, the various blocks of the orchestrator server 910 may physically reside on one or more machines, which use standard (e.g., TCP/IP) or proprietary interprocess communication mechanisms to communicate with each other.

In the embodiment shown, computer system 900 comprises a computer memory ("memory") 901, a display 902, one or more Central Processing Units ("CPU") 903, Graphics Processing Units ("GPU") 907, Input/Output devices 904 (e.g., keyboard, mouse, CRT or LCD display, etc.), other computer-readable media 905, and one or more network connections 906. As an example of the computing system used to practice the orchestrator server of the ARAIS, the orchestrator server 910 is shown as an example component residing in memory 901. In other embodiments, some portion of the contents, some of, or all of the components of the orchestrator server 910 may be stored on and/or transmitted over the other computer-readable media 905. The components of the orchestrator server 910 preferably execute on one or more CPUs 903 and manage the isolation and remoting mechanism, as described herein. Other code or programs 930 and potentially other data repositories, such as data repository 920, also reside in the memory 901, and preferably execute on one or more CPUs 903. Of note, one or more of the components in FIG. 8 may not be present in any specific implementation. For example, some embodiments embedded in other software or solely used as a remote server may not provide means for end user input or display.

In a typical embodiment, the orchestrator server 910 includes one or more graphics rendering level determination engines 911, one or more secure containers with remote application instances running 912, one or more rules engines 913 for interfacing to the determination engines 911 and for other purposes, logic for handling the secure connections to client devices (not shown), connections logic for communication with the ARAIS web server (not shown), and graphics accelerators or other processing 914. In some versions, one or more rules engines 913 include, are similar to, are the same as, or cause instantiation of one or more portions of the sensitive-information theft-prevention logic engine 209 of FIG. 2 or the information-theft prevention engines 309, 317 of FIG. 3. In at least some embodiments, the graphics rendering level determination engine 911 and/or rules engine 913 is provided external to the ARAIS and is available, potentially, over one or more networks 950. In addition, data repositories 915 and 916 may be configured to hold connection data, a cache, and pre-computed graphics rendering code. These components/modules are described in detail with reference to FIG. 2. Other and/or different modules also may be implemented. In addition, the ARAIS may interact via a network 950 with third party websites or content 955 or graphics library providers 965 that provides content such as updated versions of libraries or other tools, and one or more other computing systems 960 within the ARAIS such as other server computing systems that are part of ARAIS. Also, of note, some portions of data repository 916 may be provided external to the ARAIS as well, for example accessible over one or more networks 950.

In an example embodiment, components/modules of the orchestrator server 910 are implemented using standard programming techniques. For example, the orchestrator server 910 may be implemented as a "native" executable running on the CPU 103, along with one or more static or dynamic libraries. In other embodiments, the orchestrator server 910 may be implemented as instructions processed by a virtual machine. A range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the orchestrator system 910 (e.g., in the data repositories 915 and 916) can be available by standard mechanisms such as through C, C++, C#, and Java APIs; libraries for accessing files, databases, or other data repositories; through scripting languages such as XML; or through Web servers, FTP servers, or other types of servers providing access to stored data as consistent with the security desired. For example, in a typical orchestrator server of an ARAIS, this data would not be accessible to any systems outside of the web server/load balancer 101/106. However, as used to represent a client computing system, other data may be visible to others by one of the mechanisms described (that is one of the reasons they are vulnerable to malicious attacks). The data repositories 915 and 916 may be implemented as one or more database systems, file systems, or any other technique for storing such information, or any combination of the above, including implementations using distributed computing techniques.

Also the example orchestrator server 910 and other server and/or client computing systems described herein may be implemented in a distributed environment comprising multiple, even heterogeneous, computer systems and networks. Different configurations and locations of programs and data are contemplated for use with techniques of described herein. In addition, the server and/or client may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.), WebRTC, WebSockets, and the like. Other variations are possible. Also, other functionality could be provided by each component/module, or existing functionality could be distributed amongst the components/modules in different ways, yet still achieve the functions of an orchestrator server.

Furthermore, in some embodiments, some or all of the components of the orchestrator server 910 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 10:
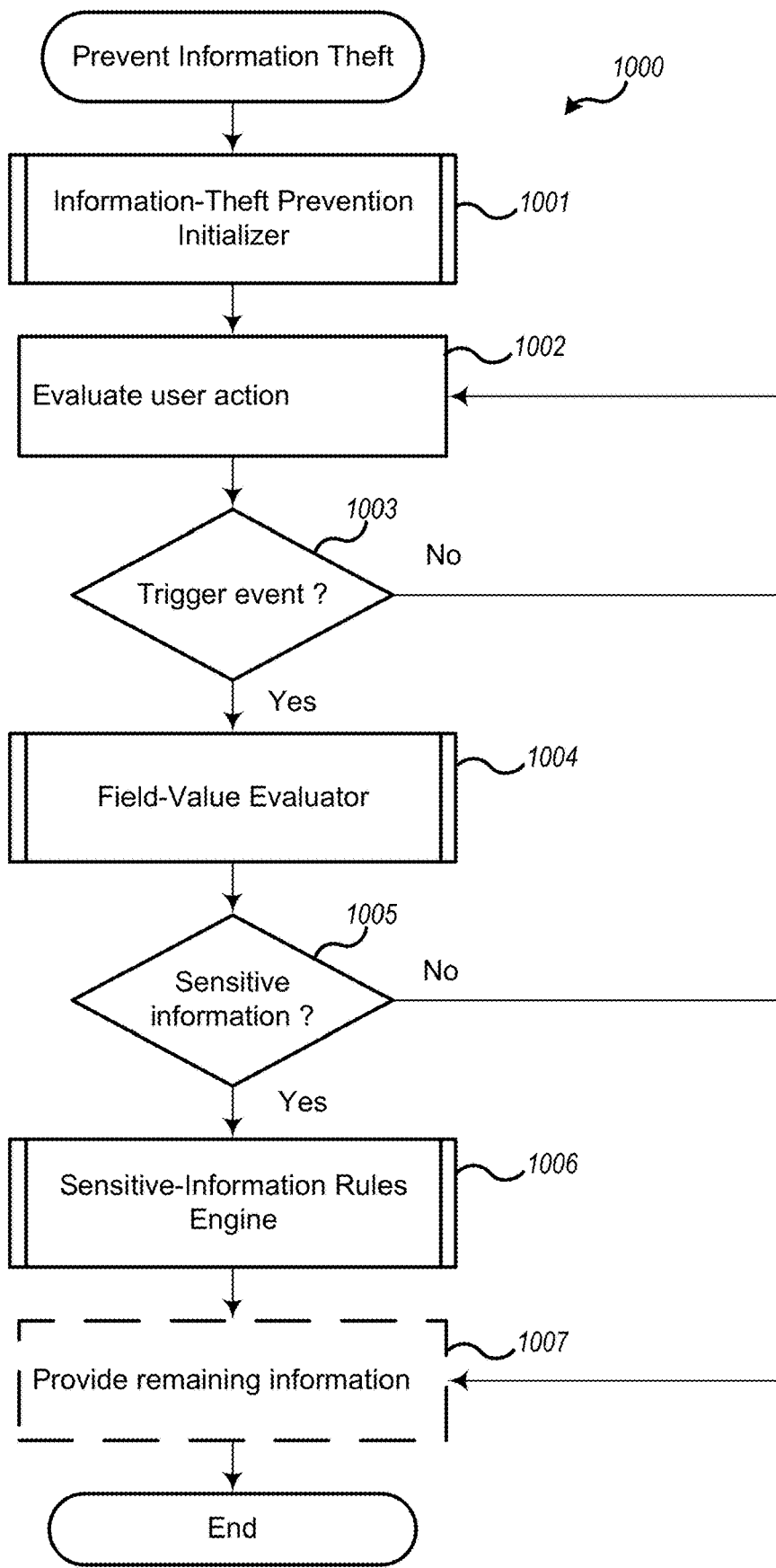
FIG. 10 is an example flow diagram of example logic provided by an example Adaptive Rendering Application Isolation System to prevent information theft.

FIG. 10 is an example overview flow diagram of the example logic for enabling information-theft prevention using an example Adaptive Rendering Application Isolation System. In block 1001, logic flows to the information-theft prevention initializer to initialize information-theft prevention, as further described regarding FIG. 11 because different situations may have different authentication processes, different sensitive-information rules, or enablement processes for information-theft prevention. For example, different users in the same or different enterprises (for example, corporations, groups within a corporation, groups within a project, or others) may have access to different sets of sensitive information, and the information-theft prevention initializer may employ different techniques or different services to enable the ARAIS to identify and verify the sensitive information for a given user. As another example, different users in the same or different enterprise may have different levels of authority to share sensitive information with non-whitelisted targets, and the information-theft prevention initializer may employ different sets of rules to enable the ARAIS to prevent providing sensitive information to non-whitelisted targets in accordance with the authority level of a given user. As a further example, different client computing devices, operating systems, or rendering applications (for example, the local application 105 executing on the client computing device 104a running a given operating system) that utilize different mechanisms for obtaining user inputs or for which different mechanisms for intercepting those inputs are appropriate, and, in the case of rendering applications other than isolator applications, the information-theft prevention initializer may generate one or more portions of one or more remote-enabling files in accordance with one or more mechanisms appropriate for a given client computing device, operating system, or rendering application. Accordingly, the mechanisms used to obtain information from the client computing device and to identify sensitive information may vary from client computing device to client computing device, operating system to operating system, rendering application to rendering application, or user to user.

Generally, application remoting with information-theft prevention preferably includes intercepting draw commands and corresponding position information at the remote application instance, providing that information to the local application, and causing the local application to render an output of the remote application instance without obtaining bitmap information. However, information-theft prevention as described herein may be employed with other application-isolation techniques (for example, Document Object Model (DOM) mirroring, pixel pushing or mirroring, or client-side application isolation) or other remoting techniques (for example, Remote Desktop Protocol (RDP)). In cases employing client-side application isolation, one or more portions or actions of one or more engines (for example, sensitive-information theft-prevention logic engine 209 of FIG. 2, information-theft prevention engines 309, 317 of FIGS. 3A and 3B, or rules engine 913 of FIG. 9) or processes (for example, the processes described regarding FIGS. 10-13) may be executed on the client computing device, preferably between the local application and a secure container running the remote application instance on the client computing device, inside the secure container yet between the local application and the remote application instance, or as a component, extension, or plug-in of the remote application instance in the secure container.

Next, the local application is caused to render one or more portions of an output of the remote application instance as discussed further above, such as a display of a web page. Preferably, the logic evaluates the actions of the remote application instance or the instructions from the target to the remote application instance to detect any scripted key event listeners (for example, JavaScript key event listeners, which may include a form or picture that appears like a form) and disables any detected scripted key event listeners to prevent malicious keystroke logging or malicious creation of a password field (for example, an HTML password field). In some cases, the information-theft prevention actions are taken according to a cascading logical hierarchy defined by one or more rules of one or more engines discussed herein, and, according to that logical hierarchy, the disabling of scripted key event listeners occurs only if no input fields such as password fields are detected (for example, the field-value evaluator fails to detect a candidate sensitive-information field in block 1004 and, responsive to that failure, attempts to detect and disable scripted key event listeners).

In block 1002, the logic evaluates one or more user actions. Examples of user actions include initiating a transfer of information from the client computing device to a target via the local application, such as initiating a data flow (for example, file upload or other type of transfer, media stream such as microphone or camera, or other data flows), submitting a form (for example, HTML or JavaScript submit event for a form), clicking a button (for example, each mouse-button click, each finger tap or input, clicking a user-input control with a mouse or a finger), entering a keystroke (for example, pressing a button on a keyboard), other user actions. In some cases, the logic evaluates the one or more user actions only if the target is determined to be a non-whitelisted target to reduce computational expenses.

In block 1003, the logic determines whether the evaluated user action is a trigger event and, if so, continues to block 1004; otherwise, the logic returns to block 1002 to continue evaluating user actions. In some cases, trigger events are defined as only existing for non-whitelisted target to reduce computational expenses. Accordingly, in those cases, information being provided to a whitelisted target need not be evaluated. Trigger events are preferably limited to certain types of evaluated user actions based on one or more rules defined by the information-theft prevention initializer in block 1001 to reduce computational expenses. For example, users in highly sensitive roles with access to highly sensitive information may have trigger events defined as a high number of user action types (up to and including any and all user actions), whereas a typical user may have trigger events defined as less than all user action types, such as only data flows and form submit events. As another example, application types that may rely on passing each user action of a given type from the local application to the target (for example, games or streams that provide each user action to the target, such as providing each keystroke one at a time) may have trigger actions defined as certain user action types, including the given user action type). As a further example, if it is detected or otherwise determined that a given target obfuscates or changes field types to trick the user or employs scripting key event listeners, trigger actions may be defined as including a different set of user action types, such as any and all keystrokes in one or more field types or any and all keystrokes regardless of whether associated with a field or a field type.

Figure 12:
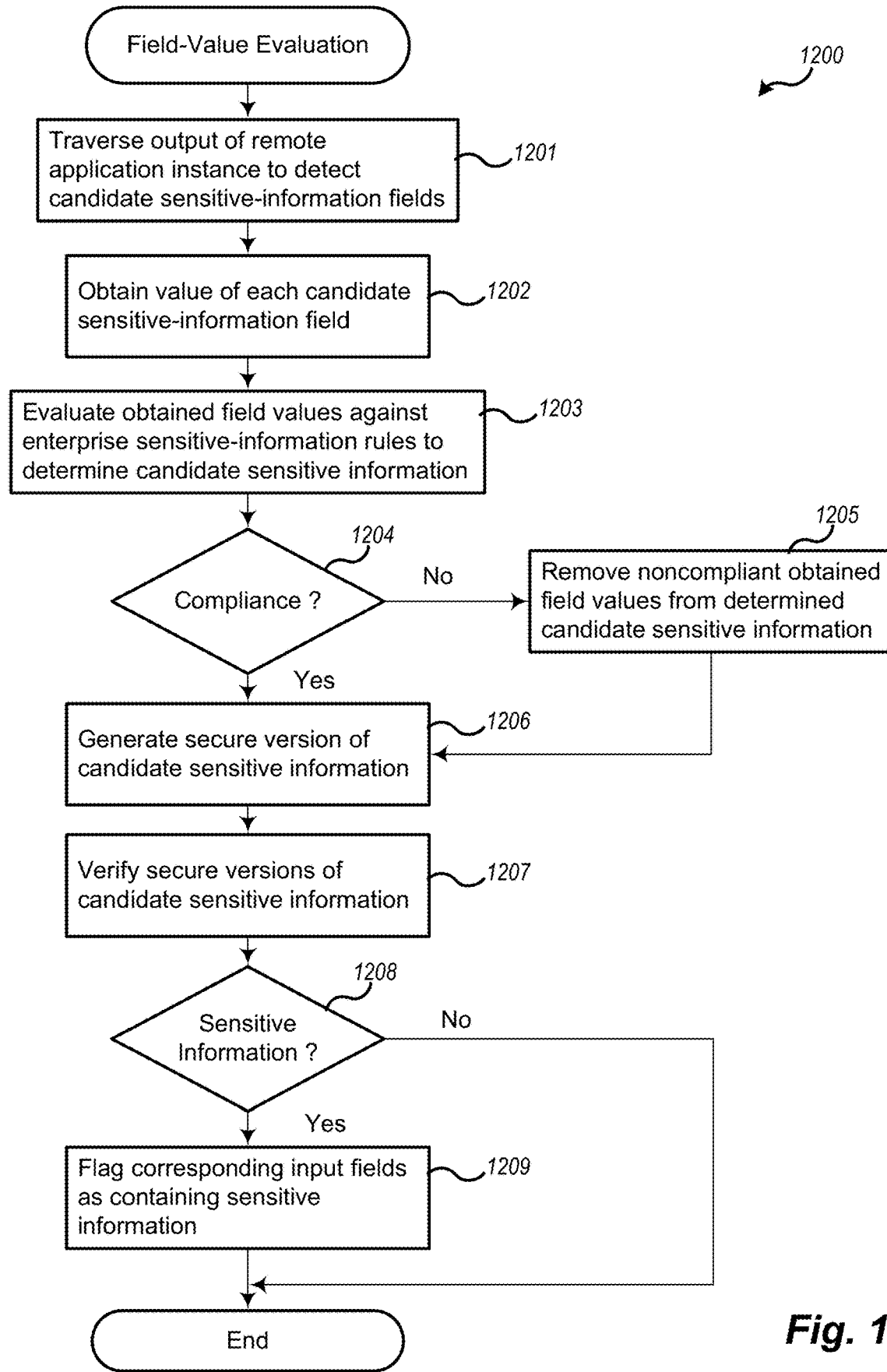
FIG. 12 is an example flow diagram of example logic provided by an example Adaptive Rendering Application Isolation System to evaluate field values.

In block 1004, logic flows in one use case to the field-value evaluator to determine whether one or more input fields contain sensitive information, as further described regarding FIG. 12 because not all information or fields on their face accurately represent whether the information includes sensitive information. In some cases, information may be transferred via mechanisms other than input fields, and the information in one or more of those other mechanisms may additionally or alternatively be evaluated in the same or similar manner as explained regarding the field-value evaluator to determine whether one or more of portions of that information contain sensitive information. For example, in the case of file transfers, one or more portions of the file or its characteristics (for example, file type, file path, file size, file name, authors or contributors, file source, number of records, number of statements, or other characteristics) may be evaluated against enterprise sensitive-information rules to determine whether the file contains candidate sensitive information, the candidate sensitive information may be verified, and one or more portions of the file or its characteristics may be flagged as including sensitive information. As another example, in the case of evaluating all keystrokes independent of field values, a given number of keystrokes (for example, a number defined by enterprise sensitive-information rules) preceding and including the most recent keystroke are evaluated to determine whether the user has typed sensitive information, and the keystrokes may be flagged as including sensitive information as appropriate based on the evaluation and verification of that information. As a further example, in the case of media streams, buffered media data from the user's microphone or camera may be evaluated against enterprise sensitive-information rules to determine whether the stream contains candidate sensitive information (for example, utilizing speech, optical character recognition, or visual object recognition to identify terms, phrases, graphics, or objects that includes candidate sensitive information), the candidate sensitive information may be verified, and one or more portions of the stream may be flagged as including sensitive information.

In block 1005, the logic determines whether there is an attempt to provide sensitive information to a target based on the result of block 1004 and, if so, continues to block 1006; otherwise (for example, no fields, keystrokes, files, streams, or other information are flagged as including sensitive information), logic flows to block 1007.

Figure 13:
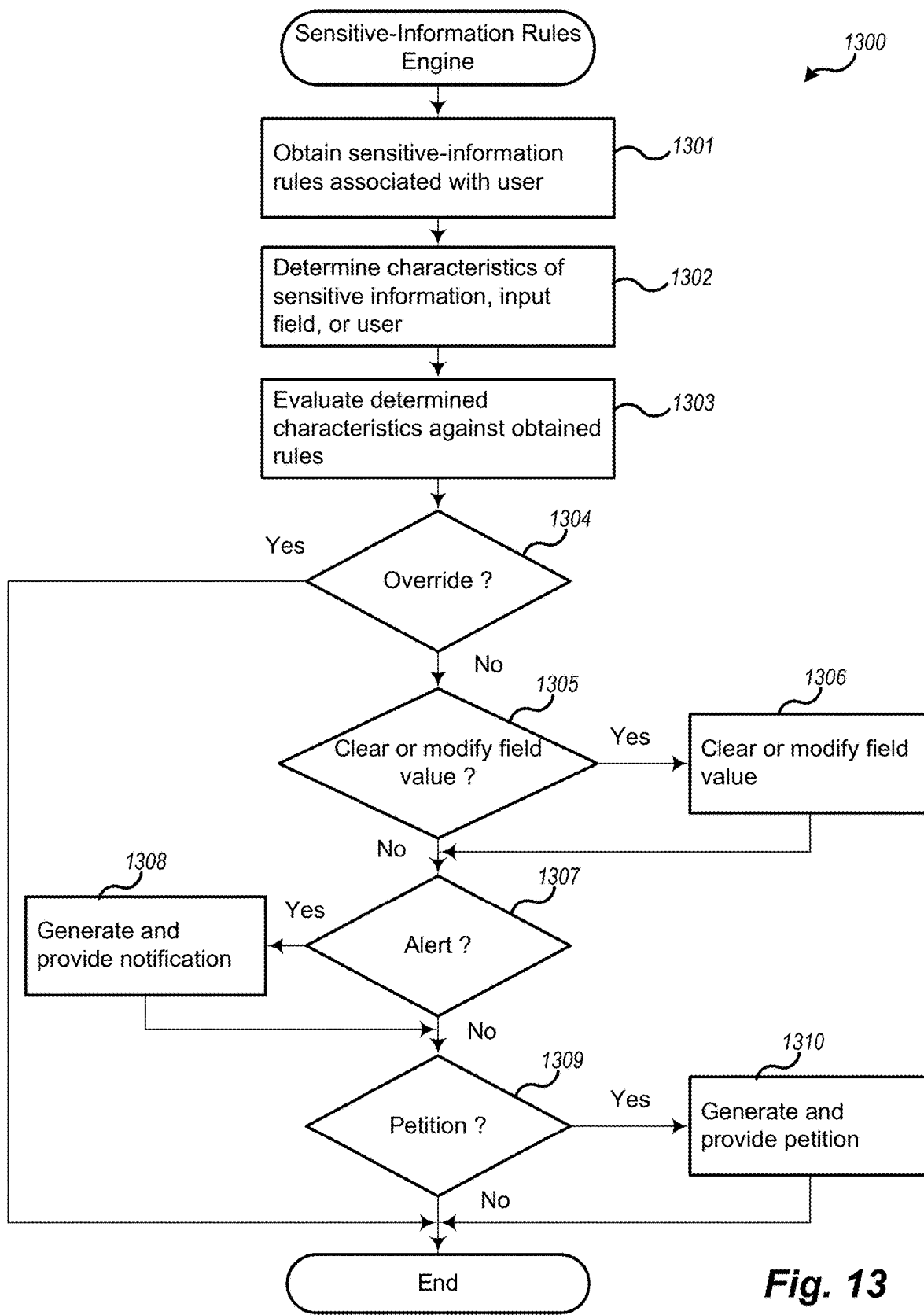
FIG. 13 is an example flow diagram of example logic provided by an example Adaptive Rendering Application Isolation System to execute rules associated with sensitive information.

In block 1006, logic flows to the sensitive-information rules engine, as further described regarding FIG. 13 because different users, sensitive information, targets, or other parameters may have different prescribed solution actions. For example, users that have more information-security training (for example, based on recorded course certificates) or demonstrated knowledge (for example, based on the user's job title) than others may be provided with less restrictive (i.e., riskier) solution actions or less restrictive or more solution options to select, whereas users with less information-security training or demonstrated knowledge may be provided with more restrictive (i.e., safer) solution actions or more restrictive, fewer, or no solution options to select. Examples of more restrictive preventative solutions include clearing, modifying, or otherwise obscuring sensitive information before providing information to the target, preventing information from being provided to the target until a system administrator approves such action, or requiring the user to undergo training, potentially before the user can undertake similar actions. Examples of less restrictive solution actions include providing the user with an option to override preventative solutions, customize how the sensitive information is handled (for example, modified or otherwise obscured) before providing information to the target, or flagging the sensitive information while allowing information to be provided to the target. In some cases, the user may be able to submit a petition (for example, a petition to a system administrator) to change rules associated with the user, the target, the isolated application, or the sensitive information.

In block 1007, the logic optionally provides remaining information to the target. Block 1007 is optional because, in some cases, no information is provided to the target, such as where providing information is blocked by the sensitive-information rules engine, the user selects an option to prevent providing the information, or no information remains after removing the sensitive information. The logic then ends.

Figure 11:
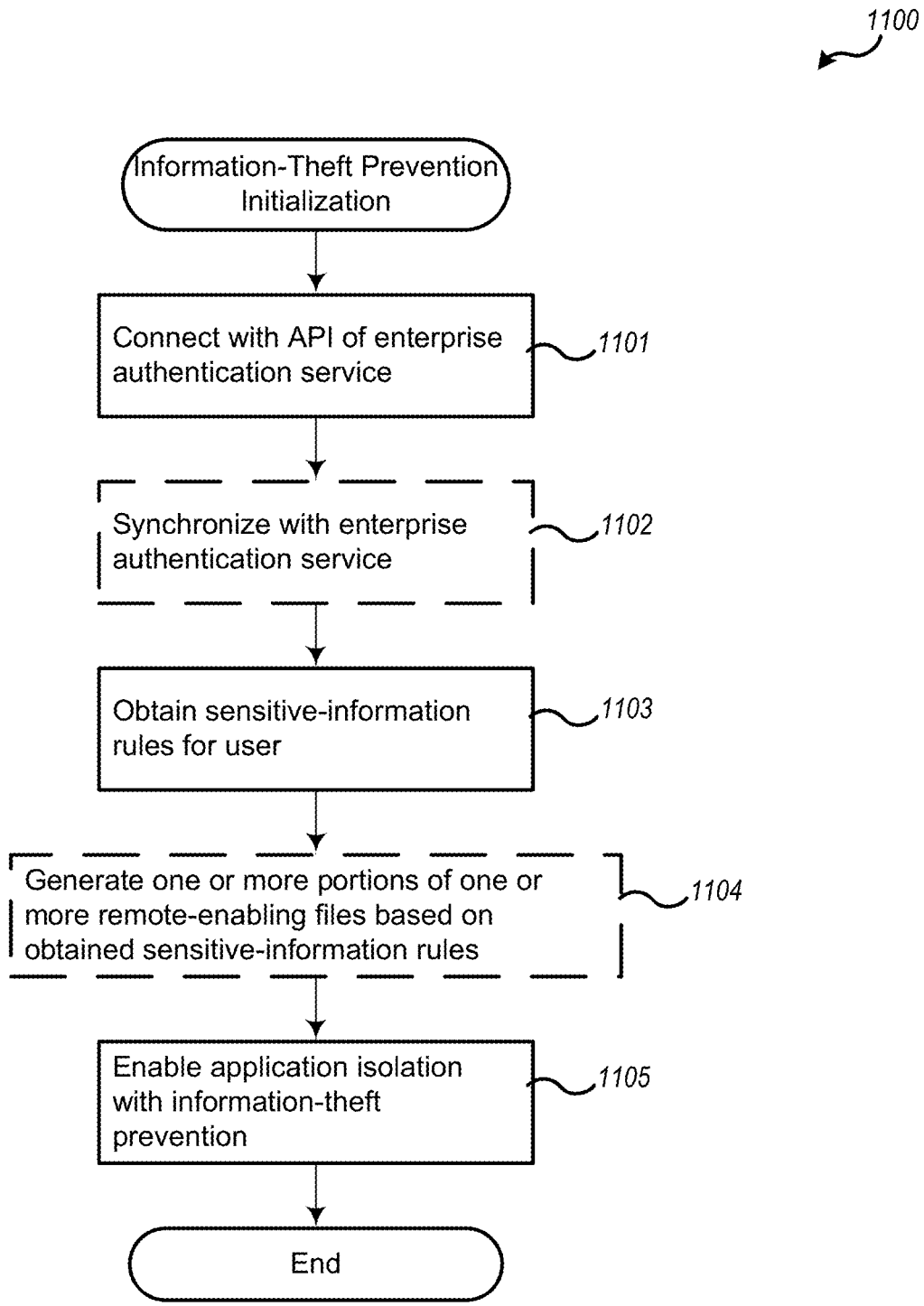
FIG. 11 is an example flow diagram of example logic provided by an example Adaptive Rendering Application Isolation System to initialize information-theft prevention.

FIG. 11 is an example flow diagram of an example logic provided by an example Adaptive Rendering Application Isolation System to initialize information-theft prevention in an application isolation session. In block 1101, the logic connects with an application programming interface (API) of one or more enterprise authentication services associated with the user, the client computing device, the isolated application, or the target to facilitate validating candidate sensitive information, obtaining rules that define sensitive information or parameters of sensitive information. In some cases, the logic registers the ARAIS with the authentication service to facilitate obtaining those rules on an on-going basis over the duration of the isolation session or beyond. The authentication service typically has a database that stores sensitive information, indicators that identify sensitive information, rules that defines sensitive information or parameters for sensitive information, associations (for example, one or more associations between one or more portions of sensitive information and one or more other portions of sensitive information, one or more users, one or more client computing devices, one or more isolated applications, one or more targets, or others), whitelists, or other data. Examples of authentication services include Active Directory, Azure Active Directory, or others. Some authentication services facilitate direct programmatic authentication. Others require indirect mechanisms, such as employing a sync client (e.g., ONEDRIVE), leveraging replication (for example, load distribution of the authentication service), federation (for example, providing messages from one network to another with agreed-upon or negotiated standards), or command line interfaces (for example, manual connection or configuration).

The information used to identify the one or more appropriate enterprise authentication services is typically included in the isolation request, as discussed, for example, regarding process 400 of FIG. 4 or process 700 of FIG. 7.

In some cases, the ARAIS may employ the authentication service for single sign-on (SSO) access controls for a given enterprise or user and may include or act as a sensitive-information manager (for example, a password manager that is either authentication service or non-authentication-service based, a cloud access security broker (CASB)) to manage sensitive information for the enterprise or user other than SSO information. In particular, many enterprises, small businesses, and medium businesses use cloud services that do not participate in enterprise SSO, such as sites provided by third-parties such as payroll vendors, suppliers, banks, or other third-parties providing services that require credentials (e.g., usernames and passwords). Accordingly, if it is clear that candidate sensitive information will not be validated with the authentication service (for example, the isolated application is determined to never use SSO information, the user does not use SSO access controls, or other circumstances), the logic may skip block 1101. In some cases, block 1101 may be skipped because the ARAIS may act as the authentication service. For example, the ARAIS may include or act as a cloud access security broker (CASB) for a given organization with which the user, the client computing device, or the isolated application is associated.

In block 1102, the logic optionally synchronizes with the enterprise authentication service. Such synchronizations preferably provide updated secure versions of sensitive information, such as hash values of passwords that users have changed. In some cases, such updates may be obtained directly from the authentication service, indirectly via a sync client, or provided by the user. Block 1102 is optional because, in some cases, the authentication service is not utilized or synchronization is not required. For example, the ARAIS may include or act as the authentication service or a CASB, and, therefore, an external enterprise authentication service is not utilized. As another example, it may be clear that SSO access controls are not used by the isolated application or the user, and, therefore, synchronizing with an external enterprise authentication service is not required. In some cases, even where the logic does not verify candidate sensitive information by utilizing a connected enterprise authentication service, the logic may synchronize with the enterprise authentication service to obtain updated rules, such as rules defining sensitive information, sensitive information parameters, authorization or access levels (for example, authorization or access levels associated with employment positions, the client computing device, the isolated application, the target, or other elements), whitelists, or other aspects.

In block 1103, the logic obtains sensitive-information rules for the user requesting the application isolation session. The sensitive-information rules typically define sensitive information (for example, types of content such as text, media, or other content types; content itself, such as particular text, words or phrases, drawings, visual objects, or other content; or other information definitions) or sensitive-information parameters (for example, password requirements, such as minimum total number of characters, minimum number of different character types, differences between prior passwords in a given lookback period, differences between the password and characteristics of the user such as birthdate or name, or other requirements). In some cases, the sensitive-information rules may define how, when, and where the user may employ sensitive information based on characteristics of the user, the client computing device, the local application, the isolated application, or the target. In some cases, the sensitive-information rules may define preventative solutions available for the user based on characteristics of the user, the client computing device, the local application, the isolated application, or the target (see process 1300 of FIG. 13). The logic preferably configures one or more engines (e.g., the sensitive-information theft-prevention logic engine 209 of FIG. 2, the information-theft prevention engine 309, 317 of FIGS. 3A and 3B, the rules engine 913, or other engines) based on the obtained sensitive-information rules to enable the one or more engines to provide information-theft prevention in accordance with those obtained rules.

In block 1104, the logic optionally generates one or more portions of one or more remote-enabling files or objects based on one or more portions of the obtained sensitive-information rules. After the local application is provided with those one or more remote-enabling files or objects, the one or more generated portions of the one or more remote-enabling files or objects cause the local application to provide messages indicative of inputs to the local application to the remote application instance or one or more other portions of one or more engines (e.g., the sensitive-information theft-prevention logic engine 209 of FIG. 2, the information-theft prevention engine 309, 317 of FIGS. 3A and 3B, the rules engine 913, or other engines). In some cases, the one or more generated portions of the one or more remote-enabling files or objects cause the local application to include or perform one or more portions or actions of the one or more engines, such as one or more portions of the processes 1000-1300 of FIGS. 10-13. In other versions, the logic includes the one or more generated portions in one or more files or objects that are separate and distinct from the one or more remote-enabling files or objects.

The one or more remote-enabling files or objects typically include those files or objects that cause the local application to intercept user input, such as keystrokes, mouse events, other cursor or input events, media streams from the client computing device, or other information provided by the user or the client computing device to the local application. Examples include those one or more files or objects or updates to one or more files or objects that are automatically integrated into the local application's standard code to configure the local application via hooking, intercepting, code injection, or other techniques (for example, the one or more files or objects described above regarding JavaScript, WebAssembly, HTML, or cookies provided to the local application regarding process 400 of FIG. 4, the process of FIG. 6, or process 700 of FIG. 7).

Block 1104 is optional because, in some cases, the entirety of the processes involved in the sensitive-information theft prevention is performed external to the local application or because, in some cases, the local application is an isolator application that is pre-configured (i.e., "out-of-the-box") with the capabilities provided by the one or more generated portions of the one or more remote-enabling files or objects. In cases where the entirety of the sensitive-information theft prevention processes is performed external to the local application, the local application merely needs to provide indications of the input information, and the remote-enabling files or objects typically configure the local application provide such indications to enable the user to provide input via the local application during an application isolation session, regardless of whether information-theft prevention is enabled. In cases where the local application is an isolator application, the local application is preferably pre-configured to perform the one or more actions associated with the one or more generated portions of the one or more remote-enabling files or objects, and the logic generates one or more portions of one or more files or objects that are configured to update the locator application (for example, updating one or more whitelists, sensitive-information rules, enterprise authentication service connection information to facilitate connecting with the authentication service, or other data).

In block 1105, the logic enables application isolation with information-theft prevention. Enabling application isolation with information-theft prevention typically includes providing the one or more remote-enabling files or objects to the local application with the one or more generated portions, as discussed regarding blocks 406 and 408 of FIG. 4, blocks 706 and 707 of FIG. 7, or elsewhere throughout this description.

Preferably, the local application is caused to render one or more portions of an output of the remote application instance as discussed further above, such as a display of a web page. Preferably, the logic evaluates the actions of the remote application instance or the instructions from the target to the remote application instance to detect any scripted key event listeners (for example, JavaScript key event listeners, which may include a form or picture that appears like a form) and disables any detected scripted key event listeners to prevent malicious keystroke logging or malicious creation of a password field (for example, an HTML password field). In some cases, the disabling of scripted key event listeners occurs only if no input fields are detected (for example, the field-value evaluator fails to detect a candidate sensitive-information field in block 1004 of FIG. 10). The logic then ends.

FIG. 12 is an example flow diagram of an example logic provided by an example Adaptive Rendering Application Isolation System to evaluate field values in an application isolation session. In block 1201, the logic traverses an output of the remote application instance to detect candidate sensitive-information fields. In some cases, the logic evaluates one or more characteristics of each field against one or more sensitive-information rules to identify one or more fields as candidate sensitive-information fields. For example, the logic may determine that fields are candidate sensitive-information fields if those fields have characteristics that match a predetermined number of sensitive-information rules (e.g., one or more, two or more, all, or other predetermined numbers of rules). In some cases, only fields that are suspected of being password fields or other fields of interest (for example, username fields, proprietary product names, code names, pattern information fields such as social security number fields, credit card number fields, check-digit validation fields, personally identifiable information (PII) fields, or other pattern information fields, or other sensitive-information fields) are indicated as being candidate sensitive-information fields. In some cases, because malicious attackers can attempt to trick users into believing that non-password fields (or fields that are not sensitive-information fields) are password fields (or other sensitive-information fields) or because there are multiple fields of interest on a single form, the logic may indicate that multiple or all input fields are candidate sensitive-information fields. Accordingly, detecting candidate sensitive-information fields is unconventional, not well known, and not routine and facilitates reducing computational expenses throughout the remainder of the processes in preventing information theft by reducing the number of field values that are evaluated.

Field characteristics include one or more of field types (e.g., password, email, hidden, telephone number, text, URL, search, or other field types), dimensions, positions, orientations, location relative to one or more other fields, initial values, maximum allowed character length, whether the field is required, whether autocomplete is permissible for the field, whether the input field should automatically receive focus when a page loads, the identity of the form to which the field belongs, the file or the URL associated with a file that will process the input control associated with the field, the encoding type associated with submission for the input field, the HTTP method for sending values of the field, whether the field requires validation prior to submission of its form, whether the user is permitted to enter more than one value in the field, whether a regular expression is used to check the field values, regular expressions used to check the field values, whether the values of the field are obscured, text near the fields, or other attributes or characteristics. As an example in the case of passwords, fields may be identified as candidate sensitive-information fields if those fields have a predetermined number or more of the following characteristics: a field type of password, obscuring values in the field, positioned under or to the right of a username text field (e.g., text field having the term "username" or others above or to the left of it) or a generic text field and within a predetermined number of pixels (e.g., 326 pixels) or distance based on the client computing device's pixels per inch (PPI) (e.g., 1 inch), positioned to the right or under the term "password" or others and within a predetermined number of pixels (e.g., 326 pixels) or distance based on the client computing device's pixels per inch (PPI) (e.g., 1 inch), being above or to the left of a button labeled "login" or others and within a predetermined number of pixels (e.g., 326 pixels) or distance based on the client computing device's pixels per inch (PPI) (e.g., 1 inch), or having other characteristics.

In block 1202, the logic obtains the value of each candidate sensitive-information field. In cases where one or more of blocks 1203-1206 are executed external to the local application, the value of each candidate sensitive-information field is provided to the appropriate one or more engines (e.g., the sensitive-information theft-prevention logic engine 209 of FIG. 2, the information-theft prevention engine 309, 317 of FIGS. 3A and 3B, the rules engine 913, or other engines) for evaluation of the one or more obtained field values. For text values, the values are typically provided in one or more messages. For other values (for example, files, images, media streams, or others), the values are typically provided by uploading the values via the secure connection (e.g., the WebRTC connection 120 of FIG. 1), File Transfer Protocol (FTP), or other uploading or data transferring mechanisms. In cases where blocks 1203-1206 are executed by the local application or an extension or plug-in of the local application, the value of each candidate sensitive-information field is preferably locally cached.

In block 1203, the logic evaluates the one or more obtained field values against one or more enterprise sensitive-information rules to determine whether the one or more obtained field values include candidate sensitive information. For example, the logic may determine that an obtained field value includes candidate sensitive information if that obtained field value has characteristics that match a predetermined number of sensitive-information rules (e.g., one or more, two or more, all, or other predetermined numbers of rules). Obtained field value characteristics include value type (e.g., text, file type, media type, or others), size (e.g., number of characters, bytes, seconds, pixels, or other metrics), character types (e.g., lower case character, upper case character, numerical character, alpha character, symbols, or others), number of each character type, or other characteristics. In the case of passwords, an obtained field value is evaluated for compliance with password policies (for example, enterprise password policies, network password policies, application password policies, verified target password policies, or others) to determine whether the text in the field value could be a password in the evaluated context. For example, one or more enterprise sensitive-information rules may indicate that an enterprise requires that enterprise passwords have a minimum length of eight characters with at least one number, at least one symbol, at least one upper case letter, at least one lower case letter, and devoid of the user's name. In this example, the one or more obtained field values would be evaluated against those one or more rules to determine whether the one or more obtained field values include a candidate password.

In block 1204, the logic determines whether the one or more obtained field values comply with the one or more enterprise sensitive-information rules and, if so, continues to block 1206; otherwise, the logic continues to block 1205. In some cases, the one or more field value characteristics must satisfy each sensitive-information rule for the logic to determine that the one or more field values comply with the one or more rules. In some cases, less than all characteristics must satisfy the one or more rules to facilitate preventing passing sensitive information that includes one or more typographical or recognition errors (for example, optical character recognition (OCR) errors, vision machine learning or artificial intelligence errors, speech-to-text errors, or others). In some cases, a score may be provided to the one or more obtained field values based on one or more tools (for example, one or more machine learning tools, artificial intelligence tools, or others) determining a level of satisfying one or more rules, and the score may be compared to one or more thresholds to determine whether the score matches or exceeds the one or more thresholds and thereby indicates that the one or more obtained field values include candidate sensitive information.

In block 1205, the logic removes each noncompliant obtained field value from the list of candidate sensitive information. Accordingly, evaluating the one or more obtained field values against sensitive-information rules to determine candidate sensitive information is unconventional, not well known, and not routine and facilitates reducing computational expenses throughout the remainder of the processes in preventing information theft by reducing the number of field values that are further evaluated.

In block 1206, the logic generates a secure version of each candidate sensitive information. Examples of secure versions include hashed, encrypted, or encoded versions of the candidate sensitive information. Preferably the candidate sensitive information is hashed to prevent reversing the secure version and thereby obtaining the candidate sensitive information.

In block 1207, the logic verifies each secure version of the candidate sensitive information. Each secure version is preferably provided to an appropriate sensitive-information verifier, such as an enterprise authentication service, sensitive-information manager, or other verifier as discussed further regarding process 1100 of FIG. 11. Accordingly, because the logic verifies the secure version of the candidate sensitive information, the ARAIS does not need to transmit (and does not transmit) the original version of the candidate sensitive information to a third-party for verification and thereby improves security of the candidate sensitive information. In some cases, the secure version of the candidate sensitive information is generated by the local application or its extension or plug-in, and the secure version of the candidate sensitive information is provided to the remoting orchestrator for verification or is provided to the sensitive-information verifier from the local application or its extension or plug-in for verification by the local application or its extension or plug-in. In other cases, the field values of all fields, field values of one or more candidate sensitive-information fields, or candidate sensitive information is provided to the remoting orchestrator to generate the secure version of the candidate sensitive information and subsequent verification.

In block 1208, the logic determines whether the candidate sensitive information actually includes sensitive information and, if so, continues to block 1209; otherwise, the logic then ends. For example, the sensitive-information verifier may return an indication of whether the secure version of the candidate sensitive information matches or otherwise complies with one or more rules regarding a secure version of the candidate sensitive information that the sensitive-information verifier has stored in a database.

In block 1209, the logic flags one or more input fields that have or had one or more values that the logic verified as containing sensitive information. The logic then ends.

FIG. 13 is an example flow diagram of an example logic provided by an example Adaptive Rendering Application Isolation System to execute rules associated with sensitive information. In block 1301, the logic obtains one or more sensitive-information rules associated with the user, the client computing device, the local application, the remote application instance, or the target. The one or more sensitive-information rules may be obtained as discussed regarding block 1103 of FIG. 11.

In block 1302, the logic determines one or more characteristics of the sensitive information, the corresponding input field, or the user. Examples of characteristics of the sensitive information or the corresponding input field include whether the local application, remote application instance, or target requires corresponding information to enable the user's desired action (for example, a target often requires an email field, password field, or others to be populated before proceeding), whether the user is authorized to provide the corresponding information, which preventative solution options are available to the user, whether the sensitive information includes enterprise sensitive information and the target is a non-enterprise target (for example, the sensitive information includes the user's enterprise credentials (e.g., username or password), and the target is the user's child's soccer team website), whether the user has attempted to provide sensitive information to non-whitelisted targets in the past, the number of times that the user has attempted to provide sensitive information to non-whitelisted targets in the past, a value score associated with the sensitive information (for example, a score indicating the importance of the sensitive information to the enterprise), or other characteristics.

In block 1303, the logic evaluates the one or more determined characteristics against the one or more obtained rules. The logic typically determines the appropriate preventative solution or solution options based on the evaluation. In some cases, different users are provided with different solutions or options based on the user's authority, the value score of the sensitive information, the identify of the target, or other characteristics or rules.

In block 1304, the logic determines whether to override the attempt to prevent sensitive-information theft and, if so, then ends; otherwise, the logic continues to block 1305. In some cases, an override may be provided automatically or responsive to the user selecting a provided option to override the sensitive-information theft prevention based on the logic determining that the user is authorized to provide the sensitive information, either generally or to the target. In other cases, an override may not be provided automatically based on the logic determining that the user lacks such authorization. If an override is provided, the logic removes the sensitive information from the list of sensitive information in the one or more evaluated field values, removes any corresponding sensitive-information flags, or simply leaves the field values alone.

In block 1305, the logic determines whether to clear or modify one or more field values that have been determined to include sensitive information and, if so, continues to block 1306; otherwise, the logic continues to block 1307. In some cases, one or more field values may be automatically modified responsive to determining that the local application, remote application instance, or target will likely allow the user to proceed with the user's intended action with non-sensitive-information in those one or more field values. For example, the logic may determine that the one or more fields having the sensitive information are required yet providing one or more different values for the one or more fields does not materially impact the user's ability to proceed (for example, non-credential fields) or that the target is known to accept one or more modified values for the one or more fields based on past interactions with the target. In some cases, one or more field values may be automatically cleared responsive to determining that the local application, remote application instance, or target does not require the one or more fields having those one or more values. In other cases, clearing or modifying one or more field values may be provided responsive to the user selecting such a provided option.

In block 1306, the logic clears or modifies one or more field values that are determined to include sensitive information based on the decision at block 1305. In some cases, modifying the one or more field values includes replacing the one or more values with values of the same or similar types. For example, alphabet characters may be replaced with different alphabet characters, numeric characters may be replaced with different numeric characters, symbols may be replaced with different symbols, or similar replacements. In another example, characters in a string may be randomly redistributed to provide a new value having the same characters in a different order. In a further example, a portion of an image, video clip (e.g., a section of video or a section of each frame in a video clip), or audio clip (e.g., a section of audio or a frequency range in a video clip) may be deleted, replaced, or scrambled using known techniques.

In block 1307, the logic determines whether to provide an alert and, if so, continues to block 1308; otherwise, the logic continues to block 1309. In some cases, the logic always provides an alert to the user or a system administrator. In some cases, the logic provides an alert responsive to the user having also previously attempted to provide sensitive information to non-whitelisted targets or having attempted to do so more than a predetermined number of times. In some cases, the logic provides an alert responsive to the user opting into receiving such alerts.

In block 1308, the logic generates and provides one or more notifications. In some cases, one or more notifications identify sensitive information that the user attempted to provide to the target or one or more corresponding input fields or sources. In some cases, one or more notifications provide advice to the user regarding information security or reports on the user's history of attempts to provide sensitive information to non-whitelisted targets.

In block 1309, the logic determines whether to submit a petition to one or more network administrators and, if so, continues to block 1310; otherwise, the logic then ends. In some cases, the logic determines to provide the user an option to submit a petition to facilitate the user requesting that the target be whitelisted, the sensitive information be reclassified as non-sensitive information, or the user's authority to provide the sensitive information be changed. In some cases, the logic always provides an option to submit a petition. In some cases, the logic provides an option to submit a petition responsive to the user's position level, historical actions, or other characteristics.

In block 1310, the logic generates and provides a petition to one or more network administrators. In some cases, the petition is partially or entirely automatically generated. In some cases, the petition includes one or more fields that are populated by input from the user, such as a request or explanation. In some cases, the logic facilitates providing the override of block 1304 responsive to automatic or manual temporary or permanent approval of the petition. Accordingly, in some cases, the logic provides a cascading prevention solution based on the availability or appropriateness (for example, based on one or more characteristics of the sensitive information, input fields, local application, isolated application, target application, user, or others) of one or more prevention solutions that are higher in the list or hierarchy of cascading prevention solutions. The logic then ends.

Although processes 1000, 1100, 1200, and 1300 are described as being executed on one or more remote systems (e.g., one or more of remoting orchestrator 102, orchestrator 200, secure container 300 or 310, or computer system 900), one or more portions of one or more of these processes may be executed on the client computing device and may be performed by the local application or its extension or plug-in. In some cases, one or more portions of processes 1000, 1100, 1200, and 1300 are executed in a hardware-based implementation that is maintained on-site with the client computing device (for example, at the employer's facility (e.g., within the physical boundaries of the perimeter of the enterprise's real property or behind a firewall that separates the hardware implementation from the target or the Internet) to provide further security to the sensitive-information theft prevention process. In some cases, one or more portions of processes 1000, 1100, 1200, and 1300 are executed in a secure web proxy that is either local or remote from the client computing device or its intranet. Although the blocks of FIGS. 4-8 and 10-13 are shown as being in a serial logic flow, they can be executed in parallel with one or more portions of each other or one or more other blocks described herein.

Figure 14:
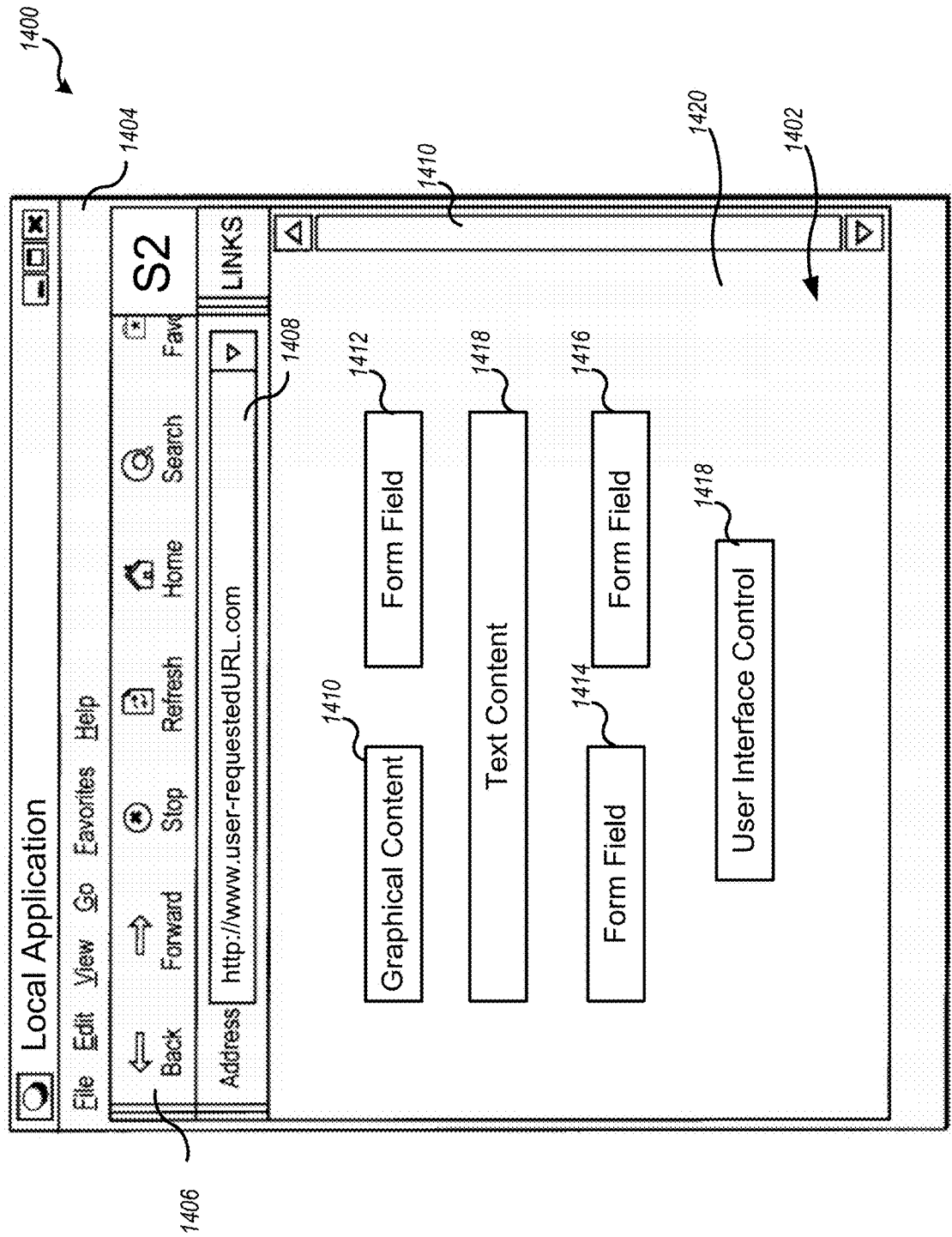
FIG. 14 is an example user interface of an example local application and an example web page displayed by the local application.

FIG. 14 is an example user interface 1400 of an example local application and a displayed portion of an example web page 1402. In this example, the user interface 1400 includes a plurality of user interface controls in a menu bar 1404, a ribbon bar 1406, an address bar 1408, and a scroll bar 1410. Also in this example, the displayed portion of the web page 1402 includes a variety of fields or objects, including graphical content 1412, multiple form fields 1412-1416, text content 1418, and a user interface control 1418 that each overlay a background 1420. One or more portions of the user interface 1400 or the displayed portion of the web page 1402 are outputs of the remote application instance.

When the user performs an action (for example, selecting one or more controls from one or more drop-down menus in the menu bar 1404, one or more user interface controls in the ribbon bar, typing in or activating action via the address bar 1408, actuating the scroll bar 1410, or manipulating one of the fields or objects 1410-1420), the user's action is evaluated to determine whether the user's action is a trigger event.

In some cases, the only trigger event may be a form submit event (JavaScript or HTML) caused by clicking the user interface control 1418. In some cases, every user action or every user action after a predetermined number of actions (for example, six keystrokes and one click) is considered a trigger event.

In some cases, the form field 1416 is determined to be a candidate sensitive-information field (e.g., a password field) because it is positioned to the right of and within a predetermined proximity (e.g., a predetermined distance or number of pixels) from the field 1414 and above the user interface control 1418. In some cases, the form field 1414 is determined to be a candidate sensitive-information field (e.g., a username field) because it is positioned to the left of and within a predetermined proximity from the field 1416 and above the user interface control 1418. In other cases the form fields 1414, 1416 are determined to be non-sensitive information fields because the form field 1412 appears above them by more than a predetermined amount (e.g., a predetermined distance or number of pixels) and is separate from the form fields 1414, 1416 by text content 1418 of substantial size (e.g., a predetermined number of words or predetermined dimensions). In some cases, one or more hidden fields are detected in the graphical content 1410, the text content 1418, or the background 1420, and, as a result, all of the fields are determined to be candidate sensitive-information fields. In some cases, one or more fields are determined to have atypical characteristics (for example, the form field 1412 is determined to have a password field type yet is in an atypical location for a password field), and, as a result, all of the fields are determined to be candidate sensitive-information fields. In some cases, one or more of the values in one or more of the fields is cleared or modified before providing the remaining values to the target. Accordingly, the user is allowed to interact with any website, regardless of whitelisting or blacklisting, yet sensitive information is protected from theft.

As used herein, the term "or" refers to a grammatical conjunction to indicate that one or more of the connected terms may be employed. For example, the phrase "one or more A, B, or C" is employed to discretely refer to each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" is not exclusive and allows for being based on additional factors not described, unless the context clearly dictates otherwise. In addition, the meaning of "a," "an," and "the" include plural references. Plural references are intended to also disclose the singular, unless the context clearly dictates otherwise. The meaning of "in" includes "in" and "on." Also, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise.

From the foregoing it will be appreciated that, although specific embodiments have been described herein for purposes of illustration, various modifications may be made without deviating from the spirit and scope of the invention. For example, the methods and systems for performing isolation-enabled rendering discussed herein are applicable to other architectures other than a Chromium or web-based architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A non-transitory machine-readable storage medium that provides instructions that, when executed by a processor causes operations to be performed including:
   instantiating an instance of a remote application in an executing computing device;
   intercepting, at the remote application instance in the executing computing device, a first set of one or more draw commands associated with output of the remote application instance;
   providing, by the executing computing device, the first set of one or more draw commands to a rendering computing device for rendering a display of a first web page, wherein the rendering computing device is remotely located, separate, and distinct from the executing computing device;
   receiving, by the executing computing device, user inputs representing an action of a user of an instance of a local application on the rendering computing device with the first web page, the local application instance and the remote application instance cooperatively providing an application isolation session isolating the local application instance from malicious changes to the remote application;
   determining that the user inputs include a trigger event;
   responsive to determining that the user inputs include the trigger event, evaluating one or more characteristics of one or more fields in a rendering output of the remote application instance to detect a candidate sensitive information field;
   determining that the candidate sensitive information field includes verified sensitive information; and
   responsive to determining that the candidate sensitive information field includes the verified sensitive information, preventing the verified sensitive information from being provided from the local application instance or the remote application instance to another application or computing device.

2. The non-transitory machine-readable storage medium of claim 1, wherein the trigger event includes one of: a form submit event, a predetermined number of keystrokes, and predetermined number of keystrokes that satisfy requirements for variety of character types.

3. The non-transitory machine-readable storage medium of claim 1, wherein evaluating the one or more characteristics of the one or more fields in the rendering output of the remote application instance to detect the candidate sensitive information field comprises:
   evaluating the one or more characteristics of the one or more fields in the rendering output of the remote application instance against sensitive-information rules; and
   determining a field of the one or more fields is a candidate sensitive information field when one or more first characteristics of the field matches a predetermined number of the sensitive-information rules.

4. The non-transitory machine-readable storage medium of claim 3, wherein a first sensitive-information rule of the sensitive-information rules evaluates character types and a character length of text in the field.

5. The non-transitory machine-readable storage medium of claim 1, wherein the operations further comprise:
   providing a notification to the user indicating the verified sensitive information that the user attempted to provide to a target of the action of the user, wherein the notification includes options to submit a petition to reclassify the verified sensitive information as non-sensitive information or to change an authority level of the user to provide the verified sensitive information.

6. The non-transitory machine-readable storage medium of claim 1, wherein preventing the verified sensitive information from being provided from the local application instance or the remote application instance to another application or computing device further comprises:
   modifying contents of the candidate sensitive information field, including one or more of:
      replacing characters, randomly redistributing characters, and deleting, replacing, or scrambling a media clip.

7. The non-transitory machine-readable storage medium of claim 1, wherein determining that the candidate sensitive information field includes the verified sensitive information further comprises:
   generating a secure version of candidate sensitive information in the candidate sensitive information field;
   comparing the generated secure version of the candidate sensitive information to a stored secure version of the candidate sensitive information; and
   identifying the candidate sensitive information as the verified sensitive information when the secure version of the candidate sensitive information matches the stored secure version of the candidate sensitive information.

8. The non-transitory machine-readable storage medium of claim 1, wherein determining that the user inputs include the trigger event further comprises:
   identifying a role associated with the user; and
   determining that the user inputs include one or more of a plurality of user action types defined as trigger events for the role associated with the user.

9. The non-transitory machine-readable storage medium of claim 1, wherein the local application instance on the rendering computing device is an instance of a web browser, and the action of the user is performed by a web application loaded in the web browser instance on the rendering computing device.

10. The non-transitory machine-readable storage medium of claim 1, wherein the local application instance on the rendering computing device is an instance of an isolator application, and the action of the user is performed by the isolator application instance on the rendering computing device.

11. A server, comprising:
   a processor; and
   a non-transitory machine-readable storage medium that stores instructions that, when executed by the processor, causes the server to perform operations including:
      instantiating an instance of a remote application in an executing computing device;
      intercepting, at the remote application instance in the executing computing device, a first set of one or more draw commands associated with output of the remote application instance;
      providing, by the executing computing device, the first set of one or more draw commands to a rendering computing device for rendering a display of a first web page, wherein the rendering computing device is remotely located, separate, and distinct from the executing computing device;

receiving, by the executing computing device, user inputs representing an action of a user of an instance of a local application on the rendering computing device with the first web page, the local application instance and the remote application instance cooperatively providing an application isolation session isolating the local application instance from malicious changes to the remote application;

determining that the user inputs include a trigger event;

responsive to determining that the user inputs include the trigger event, evaluating one or more characteristics of one or more fields in a rendering output of the remote application instance to detect a candidate sensitive information field;

determining that the candidate sensitive information field includes verified sensitive information; and responsive to determining that the candidate sensitive information field includes the verified sensitive information, preventing the verified sensitive information from being provided from the local application instance or the remote application instance to another application or computing device.

12. The server of claim 11, wherein the trigger event includes one of: a form submit event, a predetermined number of keystrokes, and predetermined number of keystrokes that satisfy requirements for variety of character types.

13. The server of claim 11, wherein evaluating the one or more characteristics of the one or more fields in the rendering output of the remote application instance to detect the candidate sensitive information field comprises:

evaluating the one or more characteristics of the one or more fields in the rendering output of the remote application instance against sensitive-information rules; and determining a field of the one or more fields is a candidate sensitive information field when one or more first characteristics of the field matches a predetermined number of the sensitive-information rules.

14. The server of claim 13, wherein a first sensitive-information rule of the sensitive-information rules evaluates character types and a character length of text in the field.

15. The server of claim 11, wherein the operations further comprise:

providing a notification to the user indicating the verified sensitive information that the user attempted to provide to a target of the action of the user, wherein the notification includes options to submit a petition to reclassify the verified sensitive information as non-sensitive information or to change an authority level of the user to provide the verified sensitive information.

16. The server of claim 11, wherein preventing the verified sensitive information from being provided from the local application instance or the remote application instance to another application or computing device further comprises:

modifying contents of the candidate sensitive information field, including one or more of:

replacing characters, randomly redistributing characters, and deleting, replacing, or scrambling a media clip.

17. The server of claim 11, wherein determining that the candidate sensitive information field includes the verified sensitive information further comprises:

generating a secure version of candidate sensitive information in the candidate sensitive information field;

comparing the generated secure version of the candidate sensitive information to a stored secure version of the candidate sensitive information; and identifying the candidate sensitive information as the verified sensitive information when the secure version of the candidate sensitive information matches the stored secure version of the candidate sensitive information.

18. The server of claim 11, wherein determining that the user inputs include the trigger event further comprises:

identifying a role associated with the user; and determining that the user inputs include one or more of a plurality of user action types defined as trigger events for the role associated with the user.

19. The server of claim 11, wherein the local application instance on the rendering computing device is an instance of a web browser, and the action of the user is performed by a web application loaded in the web browser instance on the rendering computing device.

20. The server of claim 11, wherein the local application instance on the rendering computing device is an instance of an isolator application, and the action of the user is performed by the isolator application instance on the rendering computing device.

* * * * *